United States Patent
Ohga

(10) Patent No.: US 7,158,146 B2
(45) Date of Patent: Jan. 2, 2007

(54) IMAGE PROCESSING APPARATUS AND METHOD

(75) Inventor: Manabu Ohga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/929,479

(22) Filed: Aug. 31, 2004

(65) Prior Publication Data

US 2005/0078122 A1    Apr. 14, 2005

Related U.S. Application Data

(62) Division of application No. 09/358,407, filed on Jul. 22, 1999.

(30) Foreign Application Priority Data

Jul. 24, 1998   (JP)   ................... 10-209948

(51) Int. Cl.
*G06K 9/00* (2006.01)
*H04N 9/64* (2006.01)
*H04N 9/73* (2006.01)

(52) U.S. Cl. ...................... 345/589; 345/600; 348/649; 348/655; 382/162; 382/167

(58) Field of Classification Search ................ 348/223, 348/645–659, 624, 674–675; 358/515–522, 358/500–504; 345/589–591, 593, 597, 600, 345/604, 617, 620; 382/162–167
See application file for complete search history.

(56) References Cited

U.S. PATENT DOCUMENTS

| | | | |
|---|---|---|---|
| 5,208,911 A | 5/1993 | Newman et al. | 345/600 |
| 5,276,779 A * | 1/1994 | Statt | 358/1.9 |
| 5,416,890 A | 5/1995 | Beretta | 395/131 |
| 5,432,906 A | 7/1995 | Newman et al. | 382/302 |
| H1506 H | 12/1995 | Beretta | |
| 5,583,666 A | 12/1996 | Ellison et al. | 358/518 |
| 5,598,272 A | 1/1997 | Fisch et al. | 358/298 |
| 5,754,682 A * | 5/1998 | Katoh | 382/162 |
| 5,943,680 A | 8/1999 | Shimizu et al. | 707/528 |
| 6,041,136 A | 3/2000 | Ohga | 382/162 |
| 6,088,038 A * | 7/2000 | Edge et al. | 345/600 |
| 6,118,455 A | 9/2000 | Hidaka et al. | 345/431 |
| 6,134,695 A * | 10/2000 | Sasaki et al. | 714/752 |

(Continued)

FOREIGN PATENT DOCUMENTS

EP    0 475 554    3/1992

(Continued)

*Primary Examiner*—Wesner Sajous
(74) *Attorney, Agent, or Firm*—Fitzpatrick, Cella, Harper & Scinto

(57) ABSTRACT

If gamut mapping (hue restoration) defined by one Lab color space is applied in color matching under different reference white points, the human vision perceives the hue as inconsistent. In view of this, input data which is dependent on a color space of an input device is converted by the conversion LUT 11 to color space data which is independent of any devices, based on a viewing condition at the time of viewing an input original. The data is converted to data in the human color perception space by the forward converter 12, then subjected to gamut mapping, and converted back to data in the color space independent of any devices by the inverse converter 15, based on a viewing condition at the time of viewing an output original. Then, the data is converted to output data in a color space which is dependent on an output device by the conversion LUT 16.

14 Claims, 27 Drawing Sheets

U.S. PATENT DOCUMENTS

| | | | |
|---|---|---|---|
| 6,157,735 A | 12/2000 | Holub | 382/167 |
| 6,174,285 B1 | 1/2001 | Clark | 600/443 |
| 6,211,880 B1 | 4/2001 | Impink, Jr. | 345/418 |
| 6,225,974 B1 | 5/2001 | Mardsen et al. | 345/590 |
| 6,229,915 B1 | 5/2001 | Ohkubo | 382/167 |
| 6,278,533 B1 | 8/2001 | Takemoto | 358/521 |
| 6,340,975 B1 | 1/2002 | Mardsen et al. | 345/590 |
| 6,341,175 B1 | 1/2002 | Usami | 382/167 |
| 6,362,808 B1 * | 3/2002 | Edge et al. | 345/601 |
| 6,373,531 B1 | 4/2002 | Hidaka et al. | 348/603 |
| 6,459,436 B1 | 10/2002 | Kumada et al. | 345/590 |
| 6,513,073 B1 | 1/2003 | Kawai et al. | 710/1 |
| 6,542,634 B1 | 4/2003 | Ohga | 382/167 |
| 6,611,621 B1 | 8/2003 | Shiraiwa | 382/167 |
| 6,628,822 B1 * | 9/2003 | Nakabayashi et al. | 382/162 |
| 6,659,551 B1 * | 12/2003 | Arenas | 297/229 |
| 6,859,551 B1 | 2/2005 | Ohga | 382/167 |

FOREIGN PATENT DOCUMENTS

| | | |
|---|---|---|
| EP | 0 753 725 | 1/1997 |
| JP | 5-508280 | 11/1993 |
| JP | 6-28437 A | 2/1994 |
| JP | 7-222196 A | 8/1995 |
| JP | 9-46535 A | 2/1997 |
| JP | 9-80849 A | 3/1997 |
| JP | 9-93451 A | 4/1997 |
| JP | 9-98301 A | 4/1997 |
| JP | 9-102882 A | 4/1997 |
| JP | 9-107484 A | 4/1997 |
| JP | 9-214787 A | 8/1997 |
| JP | 9-219800 A | 8/1997 |
| JP | 9-231353 A | 9/1997 |
| JP | 10-65930 A | 3/1998 |
| JP | 10/70653 A | 3/1998 |
| WO | WO92/17982 A | 10/1992 |

* cited by examiner

VIEWING CONDITION OF INPUT SIDE

- LUMINANCE: 90 cd/m² — 192
- ILLUMINANT: D93 ▶ — 193
- AMBIENT LIGHT: DARK ▶ — 194
- ADAPTABILITY: 1.0 — 195

VIEWING CONDITION OF OUTPUT SIDE

- LUMINANCE: 200 cd/m² — 196
- ILLUMINANT: F2 ▶ — 197
- AMBIENT LIGHT: AVERAGE ▶ — 198
- ADAPTABILITY: 1.0 — 199

OK    CANCEL

FIG. 26

| USER LEVEL: | GENERAL USER ▼ | ~202 |

VIEWING CONDITION OF INPUT SIDE

| VIEWING SUBJECT: | MONITOR ▼ | 203 |
| LIGHTNESS: | AVERAGE ▼ | 204 |
| WHITE POINT: | BLUISH WHITE ▼ | 205 |
| AMBIENT LIGHT: | DARK ▼ | 206 |

VIEWING CONDITION OF OUTPUT SIDE

| VIEWING SUBJECT: | PRINTOUT ▼ | 207 |
| LIGHTNESS: | BRIGHT ▼ | 208 |
| WHITE POINT: | WHITE FLUORESCENT ▼ | 209 |
| AMBIENT LIGHT: | AVERAGE ▼ | 2010 |

VIEWING SPACE

2011   2012
0   ∞

OK   CANCEL

FIG. 27

IMAGE PROCESSING APPARATUS AND METHOD

CROSS REFERENCE TO RELATED APPLICATION

This application is a division of application Ser. No. 09/358,407, filed Jul. 22, 1999, the entire content of which is hereby incorporated herein by reference.

BACKGROUND OF THE INVENTION

The present invention relates to an image processing apparatus and method, and more particularly, to an image processing apparatus and method for performing color matching according to ambient light.

FIG. 1 is a conceptual view of general color matching.

Input RGB data is converted by an input profile to XYZ data of a color space which does not depend on any devices. Since an output device cannot express colors outside the color reproduction range of the output device, gamut mapping is performed on the inputted data, which has been converted to the data in the device-independent color space, such that all colors of the inputted data fall within the color reproduction range of the output device. After the gamut mapping is performed, the inputted data is converted from the device-independent color space to CMYK data of a color space which is dependent on the output device.

In color matching, a reference white point and ambient light are fixed. For instance, according to a profile specified by the International Color Consortium (ICC), Profile Connection Space (PCS) for associating profiles uses XYZ values or Lab values based on D50 characteristic. Therefore, correct color reproduction is guaranteed when an inputted original document and a printout are viewed under an illuminant of D50 characteristic. Under an illuminant of other characteristics, correct color reproduction is not guaranteed.

When a sample (e.g., an image) is viewed under different illuminants, XYZ values of the viewed sample naturally vary. The XYZ values under various illuminants are predicted by conversion methods such as (1) ratio conversion, (2) Von Kries conversion, and (3) prediction formula using a color perception model.

In the ratio conversion method, XYZ values under a reference white point W1 are converted to XYZ values under a reference white point W2 at a ratio of W2/W1. If this conversion method is applied to the Lab uniform color space, the Lab values under W1 become equal to the Lab values under W2. Assuming that XYZ values of a sample under W1(Xw1, Yw1, Zw1) are (X1, Y1, Z1) and XYZ values of the sample under W2(Xw2, Yw2, Zw2) are (X2, Y2, Z2), the following relations are obtained by the ratio conversion:

$$X2 = \frac{Xw2}{Xw1}X1$$
$$Y2 = \frac{Yw2}{Yw1}Y1 \quad (1)$$
$$Z2 = \frac{Zw2}{Zw1}Z1$$

According to the Von Kries conversion, XYZ values under the reference white point W1 are converted to XYZ values under the reference white point W2 at a ratio of W2'/W1' in a human color perception space PQR. If this conversion method is applied to the Lab uniform color space, the Lab values under W1 do not become equal to the Lab values under W2. Assuming that XYZ values of a sample under W1(Xw1, Yw1, Zw1) are (X1, Y1, Z1) and XYZ values of the sample under W2(Xw2, Yw2, Zw2) are (X2, Y2, Z2), the following relations are obtained by Von Kries conversion:

$$\begin{bmatrix} X2 \\ Y2 \\ Z2 \end{bmatrix} = [\text{inv\_Mat}] \begin{bmatrix} \frac{P_{w2}}{P_{w1}} & 0 & 0 \\ 0 & \frac{Q_{w2}}{Q_{w1}} & 0 \\ 0 & 0 & \frac{R_{w2}}{R_{w1}} \end{bmatrix} [Mat] \begin{bmatrix} X1 \\ Y1 \\ Z1 \end{bmatrix} \quad (2)$$

where $$\begin{bmatrix} Pw2 \\ Qw2 \\ Rw2 \end{bmatrix} = [Mat] \begin{bmatrix} Xw2 \\ Yw2 \\ Zw2 \end{bmatrix} \quad (3)$$

$$\begin{bmatrix} Pw1 \\ Qw1 \\ Rw1 \end{bmatrix} = [Mat] \begin{bmatrix} Xw1 \\ Yw1 \\ Zw1 \end{bmatrix} \quad (4)$$

$$[\text{inv\_Mat}] = \begin{bmatrix} 1.85995 & -1.12939 & 0.21990 \\ 0.36119 & 0.63881 & 0 \\ 0 & 0 & 1.08906 \end{bmatrix} \quad (5)$$

$$[Mat] = \begin{bmatrix} 0.44024 & 0.70760 & -0.08081 \\ -0.22630 & 1.16532 & 0.04570 \\ 0 & 0 & 0.91822 \end{bmatrix} \quad (6)$$

To convert XYZ values under a viewing condition VC1 (including W1) to XYZ values under a viewing condition VC2 (including W2), the prediction formula using a color perception model, which is a conversion method such as CIE CAM 97s using the human color perception space QMH (or JCH) is employed. Herein, Q for QMH represents brightness, M represents colorfulness, and H represents hue quadrature or hue angle. J for JCH represents lightness, C represents chroma, and H represents hue quadrature or hue angle. If this conversion method is applied to the Lab uniform color space, the Lab values under W1 are not equal to the Lab values under W2, as similar to the case of the Von Kries conversion. Assuming that XYZ values of a sample under W1(Xw1, Yw1 Zw1) are (X1, Y1, Z1) and XYZ values of the sample under W2(Xw2, Yw2, Zw2) are (X2, Y2, Z2), the Von Kries conversion performs the following conversion:

(X1, Y1, Z1)→[forward conversion of CIE CAM97s]→ (Q, M, H) or (J, C, H)→[inverse conversion of CIE CAM97s] (X2, Y2, Z2)

In other words, if it is assumed that XYZ values under a reference white point which varies depending on a ratio conversion can be converted, the contour lines of hue in the Lab color spaces under various reference white points are always the same. However, if human color perception is taken into consideration, such as the Von Kries conversion or prediction formula using a color perception model, the contour lines of hue in the Lab color spaces under different reference white points vary depending on the reference white points.

Because of the above reason, if gamut mapping (hue restoration) defined under one Lab color space is applied to color matching under different reference white points, the human vision perceives the hue as inconsistent.

Moreover, in the current ICC profile, since the PCS is limited to XYZ values or Lab values based on D50 characteristic, color matching corresponding to ambient light cannot be performed.

SUMMARY OF THE INVENTION

The present invention is made in consideration of the above situation, and has as its object to provide an image processing apparatus and method for performing excellent color matching under different viewing conditions.

In order to attain the above object, the present invention provides an image processing method for performing color process based on a color appearance model, the image processing method comprising the steps of: inputting location information which relates to a positional relation between a viewing subject in a data source side and a viewing subject in a data destination side; and controlling the color process based on the inputted location information.

Another object of the present invention is to provide an image processing apparatus and method for enabling a user to readily set a viewing condition.

In order to attain the above object, the present invention provides an image processing method having a user interface for manually inputting location information which relates to a positional relation between a viewing subject in a data source side and a viewing subject in a data destination side, and a user interface for manually inputting viewing information which relates to a viewing condition, for performing color process on input image data based on a color appearance model, the image processing method comprising the step of controlling the color process based on the inputted location information and viewing information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 25 shows an example of a Graphic User Interface (GUI) for setting a parameter of a viewing condition according to a sixth embodiment of the present invention;

FIG. 26 shows an example of a GUI which enables setting of a user level; and

FIG. 27 shows the GUI of FIG. 26, whose user level is set in "professional level".

DETAILED DESCRIPTION OF THE PREFERRED EMBODIMENTS

Preferred embodiments of the image processing apparatus and method as well as the profile generating method according to the present invention will be described in detail with reference to the accompanying drawings.

First, a color appearance model used in the following embodiments is described with reference to FIG. 19.

A color perceived by human visual system is different depending on conditions, such as the difference in lighting or a background on which a stimulus as a viewing subject is placed, even if the characteristic of light entering the eye is the same.

For instance, a white color, illuminated by an incandescent lamp, is not perceived as red as the characteristic of light entering the eye, but is perceived as white. A white color placed on a black background is perceived brighter than a white color placed on a bright background. The former phenomenon is known as chromatic adaptation and the latter is known as a contrast. In view of this, colors must be displayed not by the XYZ color system, but by the volume corresponding to a physiological activity level of visual cells distributed on the retina. For this purpose, a color appearance model has been developed. The CIE (Commission Internationale de l'Eclairage) recommends using the CIE CAM97s. This color appearance model utilizes color perception correlation values, which are H (hue), J (lightness) and C (chroma), or H (hue), Q (brightness) and M (colorfulness), as physiological three primary colors of color vision, and is considered as a color display method which do not depend upon viewing conditions. By reproducing colors so as to match the values of H, J and C or H, Q and M between devices, it is possible to solve the problem of different viewing conditions in an input image and output image.

Figure 19:
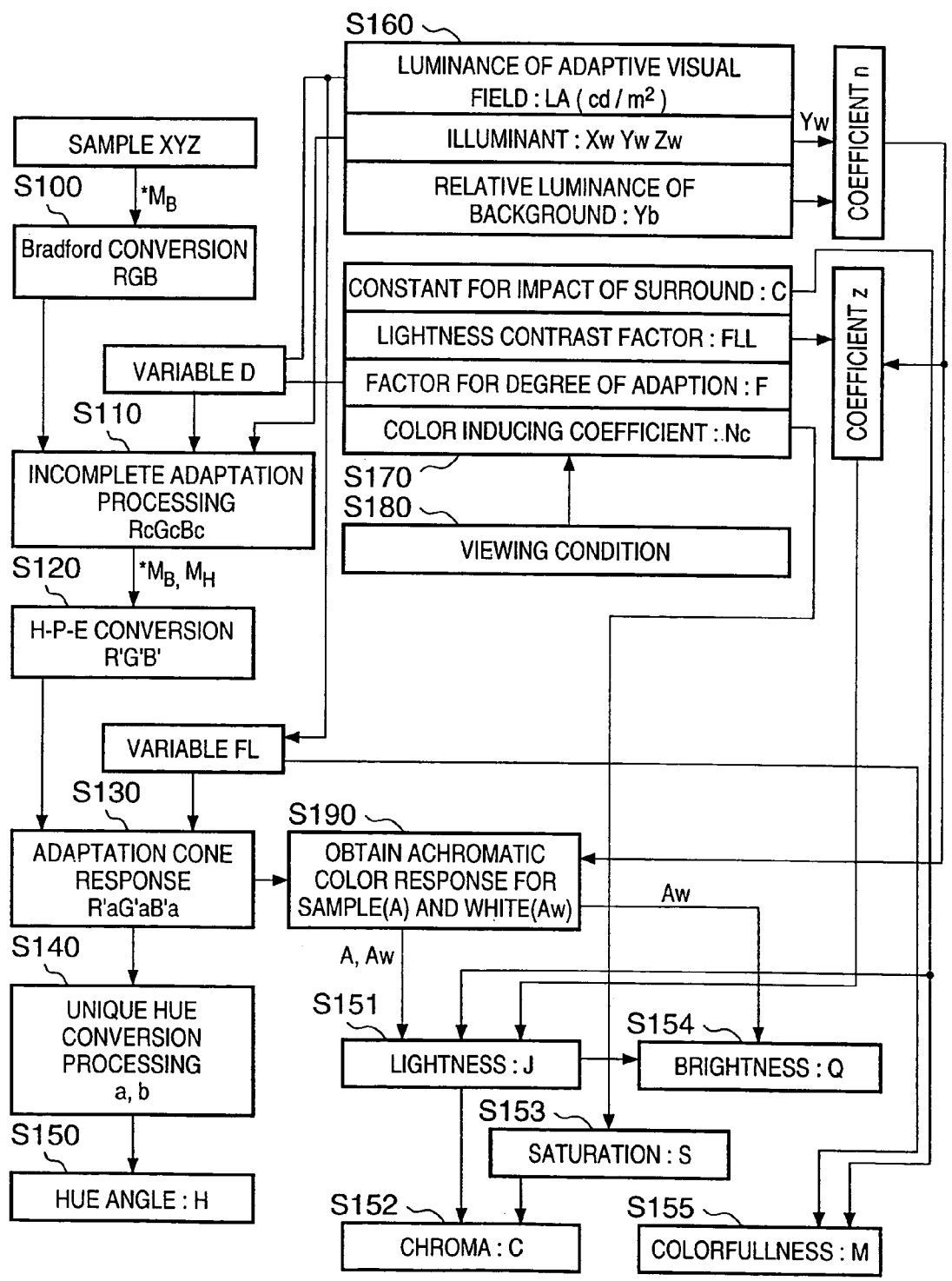
FIG. 19 is an explanatory block diagram of a color appearance model used in the embodiments of the present invention.

Description will be provided with reference to FIG. 19 for the processing of forward conversion of the color appearance model CIE CAM97s, for performing correction processing (conversion from XYZ to JCH or QMH) in accordance with a viewing condition at the time of viewing an image to be inputted.

In step S160, LA indicative of a luminance of an adaptive visual field (cd/m$^2$) (normally, 20% of white luminance in the adaptive visual field is selected), XYZ indicative of relative tristimulus values of a sample under an illuminant condition, XwYwZw indicative of relative tristimulus values of a white light under the illuminant condition, and Yb indicative of a relative luminance of a background under the illuminant condition are set as the viewing condition information of an image to be inputted. Based on the type of viewing condition specified in step S180, a constant c indicative of an impact of surround, a chromatic induction factor Nc, a lightness contrast factor FLL, and an factor for degree of adaptation F are set as the viewing condition information of the input image in step S170.

Based on the input image viewing condition information set in steps S160 and S170, the following processing is performed on the XYZ representing an input image.

First, the XYZ are converted based on the Bradford's three primary colors, which are considered as human physiological three primary colors, to obtain RGB corresponding to Bradford's cone response (step S100). Since human vision does not always completely adapt to the viewing illuminant, a variable D indicative of adaptability is obtained based on a luminance level and a viewing condition (LA and F). Based on the obtained variable D and XwYwZw, incomplete adaptation processing is performed on RGB to be converted to RcGcBc (step S110).

Next, RcGcBc is converted based on Hunt-Pointer-Estevez's three primary colors, which are considered as human physiological three primary colors, to obtain R'G'B' corresponding to Hunt-Pointer-Estevez's cone response (step S120). The adaptability of R'G'B' is estimated by a stimulus intensity level to obtain R'aG'aB'a corresponding to an adapted cone response which corresponds to both the sample and white (step S130). Note that in step S130, non-linear response compression is performed by using a variable FL which is calculated based on the luminance LA of the adaptive visual field.

Then, to obtain the correlation between a color perception and the XYZ, the following processing is performed.

Opposite color responses a and b of red-green and yellow-blue are calculated from R'aG'aB'a (step S140), and a hue H is calculated from the opposite color responses a and b and a eccentricity factor (step S150).

Then, a background inducing coefficient n is calculated from Yw and the relative luminance Yb of the background. By using the background inducing coefficient n, achromatic color responses A and Aw with respect to both the sample and white are calculated (step S190). Lightness J is calculated by using a coefficient z, calculated from the background inducing coefficient n and lightness contrast factor FLL, and the achromatic color responses A and Aw as well as the impact of surround constant c (step S151). A saturation S is calculated from the chromatic induction factor NL (step S153), then from the saturation S and lightness J, a chroma C is calculated (step S152), and a brightness Q is calculated from the lightness J and achromatic color response Aw for white (step S154).

A colorfulness M is calculated from the variable FL and impact of surround constant c (step S155).

<First Embodiment>

Description is provided for the first embodiment in which a profile is dynamically changed in accordance with a viewing condition.

Figure 1:
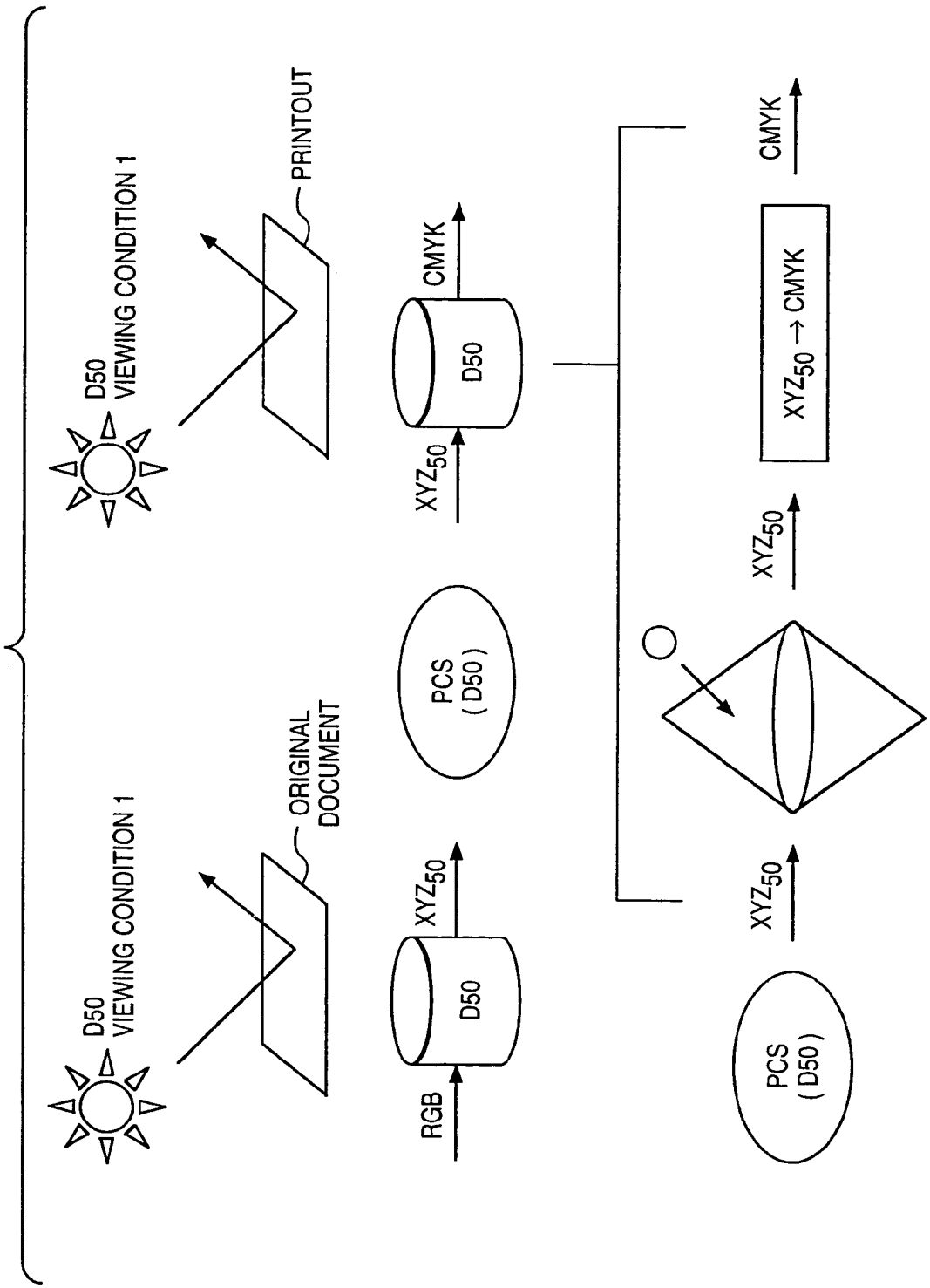
FIG. 1 is a conceptual view of color matching.
Figure 2:
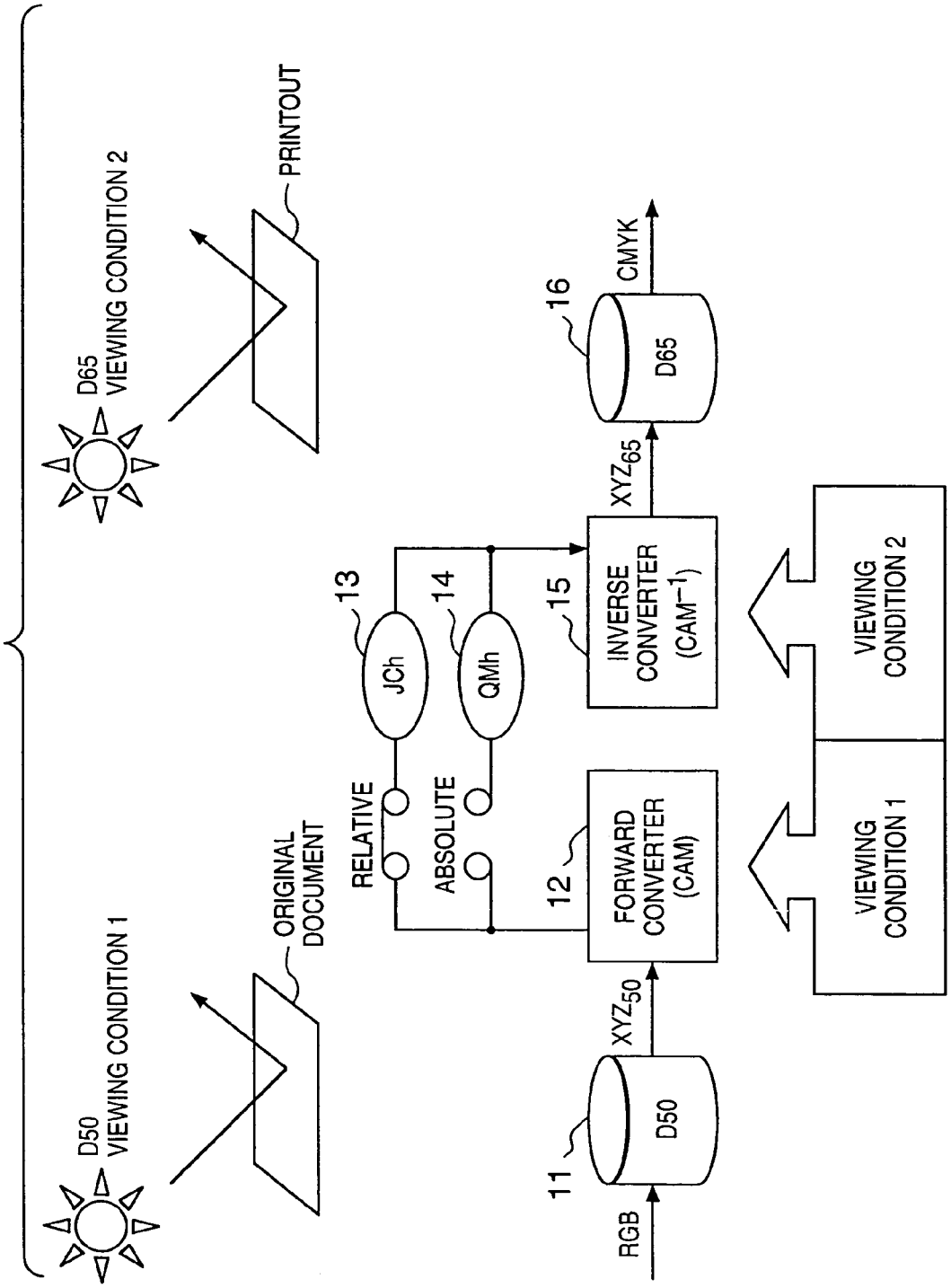
FIG. 2 is an explanatory view showing a concept of the present invention.

Referring to FIG. 2 which describes a concept of the present invention, reference numeral 11 denotes a conversion matrix or a conversion lookup table (LUT) for converting data which is dependent on an input device (hereinafter referred to as input-device-dependent data) to data of the device-independent color space (hereinafter referred to as input-independent data), which accords to a white point of ambient light at the time of viewing an image formed on an original. Reference numeral 12 denotes a forward converter (CAM) of a color appearance model for converting data, obtained from the conversion LUT 11, to human color perception color space JCh or QMh. Reference numeral 13 denotes a relative color perception space JCh (or JCH) relative to the reference white of an ambient light; and 14, an absolute color perception space QMh (or QMH) whose size changes in accordance with an illuminance level. Reference numeral 15 denotes an inverse converter of a color appearance model for converting data of the human's color perception space JCh or QMh to data of the device independent color space (hereinafter referred to as output-independent data), which accords to a white point of ambient light at the time of viewing an image formed on a printout. Reference numeral 16 denotes a conversion LUT for converting data, obtained from the inverse converter 15, to data which is dependent on an output device (hereinafter referred to as output-device-dependent data).

Generally, the white point of ambient light under a viewing condition is different from a white point of the standard illuminant at the time of colorimetry of a color target or color patch or the like. For instance, the standard illuminant used at the time of colorimetry is D50 or D65, but an ambient light for actually viewing an image is not always D50 or D65 in a light booth. An illumination light from an incandescent lamp or fluorescent light, or a combination of illumination light and sunlight are often used as the ambient light in which the image is actually viewed. In the following description, although an illuminant characteristic of an ambient light under a viewing condition is assumed as D50, D65 and D93 to simplify the description, in reality, XYZ values of a white point on a medium is set as a white point.

Figure 3:
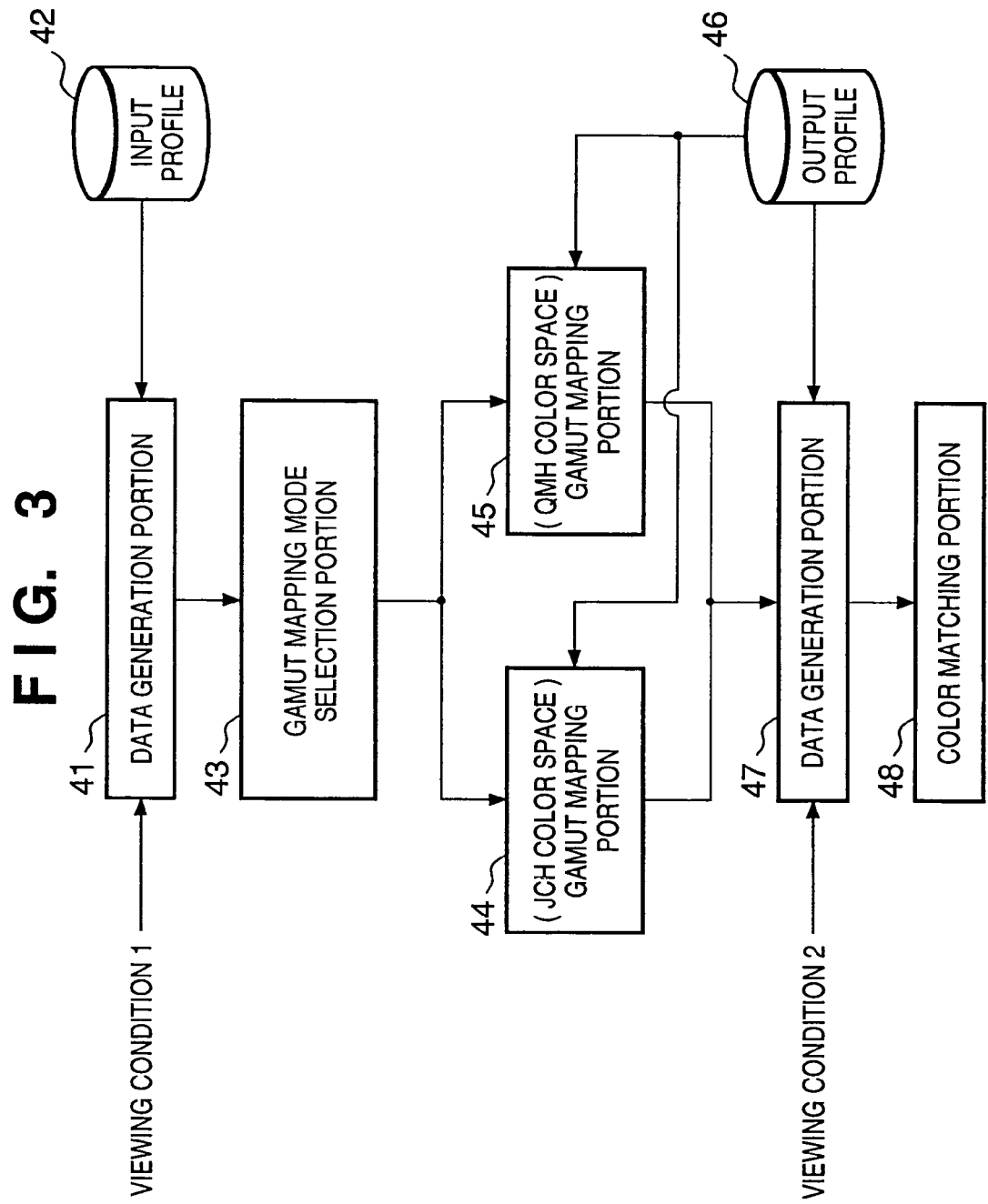
FIG. 3 is a block diagram showing the functional configuration of a first embodiment of the present invention.

FIG. 3 is a block diagram showing a functional configuration of the present embodiment. In FIG. 3, reference numeral 41 denotes a data generation portion for generating data, which is dependent on the viewing condition 1 of a data input side, based on an input profile 42 and the viewing condition 1. Reference numeral 43 denotes a gamut mapping mode selection portion for selecting whether the gamut mapping is performed in the JCH color perception space or in the QMH color perception space in accordance with designation by a user or designation by the profile. Reference numerals 44 and 45 denote gamut mapping portions respectively for performing gamut mapping on data in the JCH or QMH color perception space in accordance with an output profile 46. Reference numeral 47 denotes a data generation portion for generating data, which is dependent on a viewing condition 2 of an image output side, based on the output profile 46 and viewing condition 2. Reference numeral 48 denotes a color matching portion for performing color matching by utilizing the data which is dependent on the viewing condition 1, the gamut mapped data, the data which is dependent on the viewing condition 2, and color appearance model.

Figure 18:
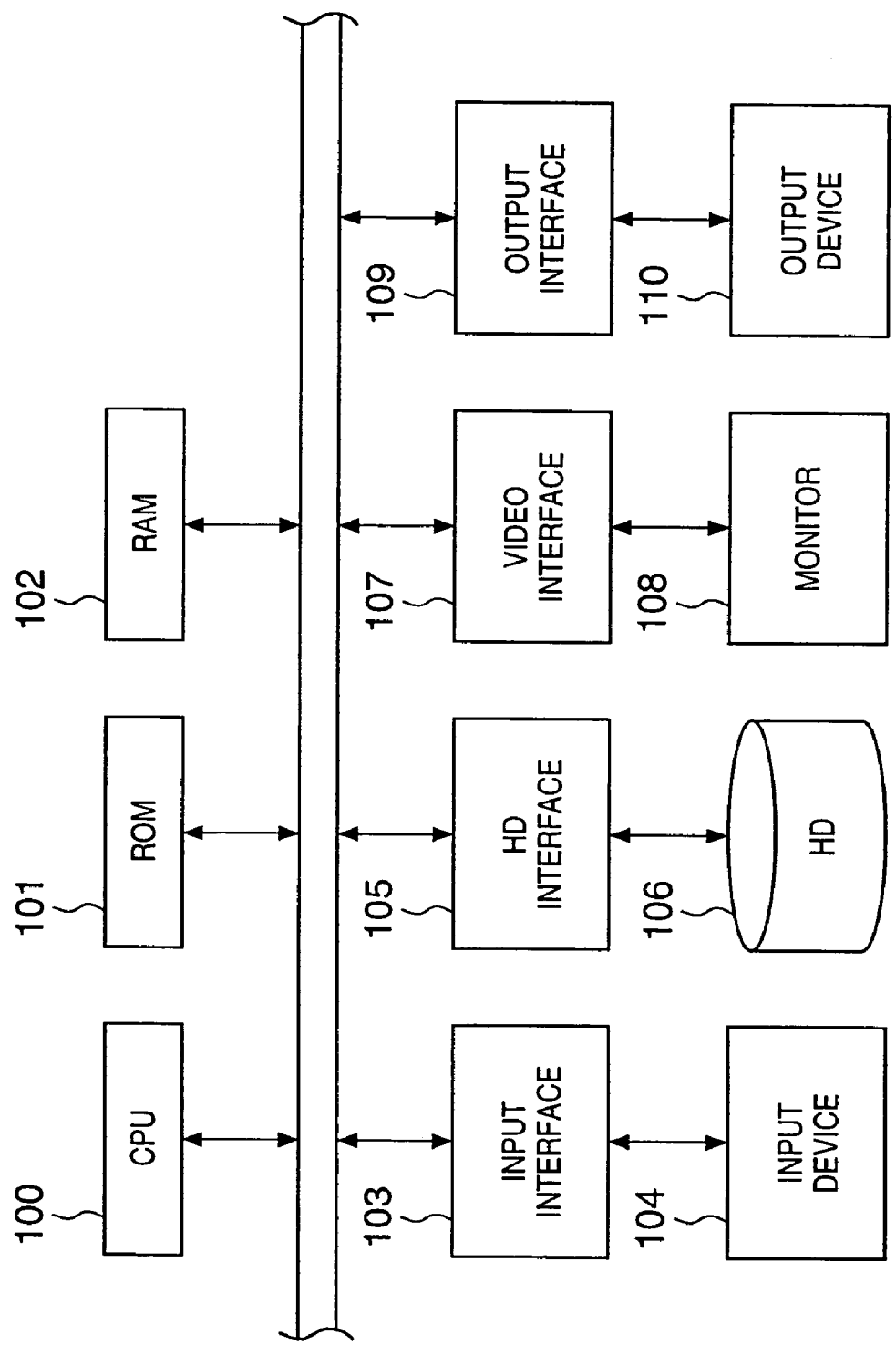
FIG. 18 is a block diagram showing a construction of an apparatus which realizes the functional configuration shown in FIG. 3.

FIG. 18 is a block diagram showing a construction of an apparatus which realizes the functional configuration shown in FIG. 3. It goes without saying that the apparatus shown in FIG. 18 is realized by supplying a general computer apparatus, such as a personal computer or the like, with software which realizes the function shown in FIG. 3. In this case, the software which realizes the function of the present embodiment may be included in the Operating System (OS) which is the basic system software of the computer apparatus, or may be provided, for instance, as a driver software of an input/output device independently of the OS.

In FIG. 18, a CPU 100 controls operation of the entire apparatus according to a program stored in a ROM 101 and hard disk (HD) 106 and the like, by utilizing a RAM 102 as a work memory, and executes various processing including the processing related to the above-described color matching. An input interface 103 is provided to connect an input device 104; a hard disk interface 105 is provided to connect the HD 106; a video interface 107 is provided to connect a monitor 108; and an output interface 109 is provided to connect an output device 110.

Note that the input device according to the present embodiment includes an image sensing device such as a digital still camera or a digital video camera or the like, and various image input devices including an image reader such as an image scanner or film scanner or the like. The output device according to the present embodiment includes a color monitor such as a CRT or LCD or the like, and an image output device such as a color printer or film recorder or the like.

A general interface is utilized as the interface of the present embodiment. Depending on the usage purpose, a serial interface such as RS232C, RS422 or the like, a serial bus interface such as IEEE 1394, Universal Serial Bus (USB) or the like, and a parallel interface such as SCSI, GPIB, centronics or the like, are applicable.

Input/output profiles for color matching are stored in the HD 106. However, the storage medium is not limited to hard disk, but may be an optical disk such as a magneto-optical disk (MO) or the like.

Hereinafter, description is provided for an example of performing color matching by using the input/output profiles.

[Generating Data Dependent on Viewing Condition 1]

The conversion LUT 11 is generated by the data generation portion 41. Methods of generating the conversion LUT 11 include: a method of reconstructing the conversion LUT 11 so as to correspond to an ambient light, based on a relation between XYZ values (or Lab values) of a color target and RGB values of an input device as shown in FIG. 4; and a method of updating a conversion LUT stored in the input profile 42, which is provided for converting an RGB space dependent on a device to XYZ color space, to the conversion LUT 11 which corresponds to the ambient light.

Figure 4:
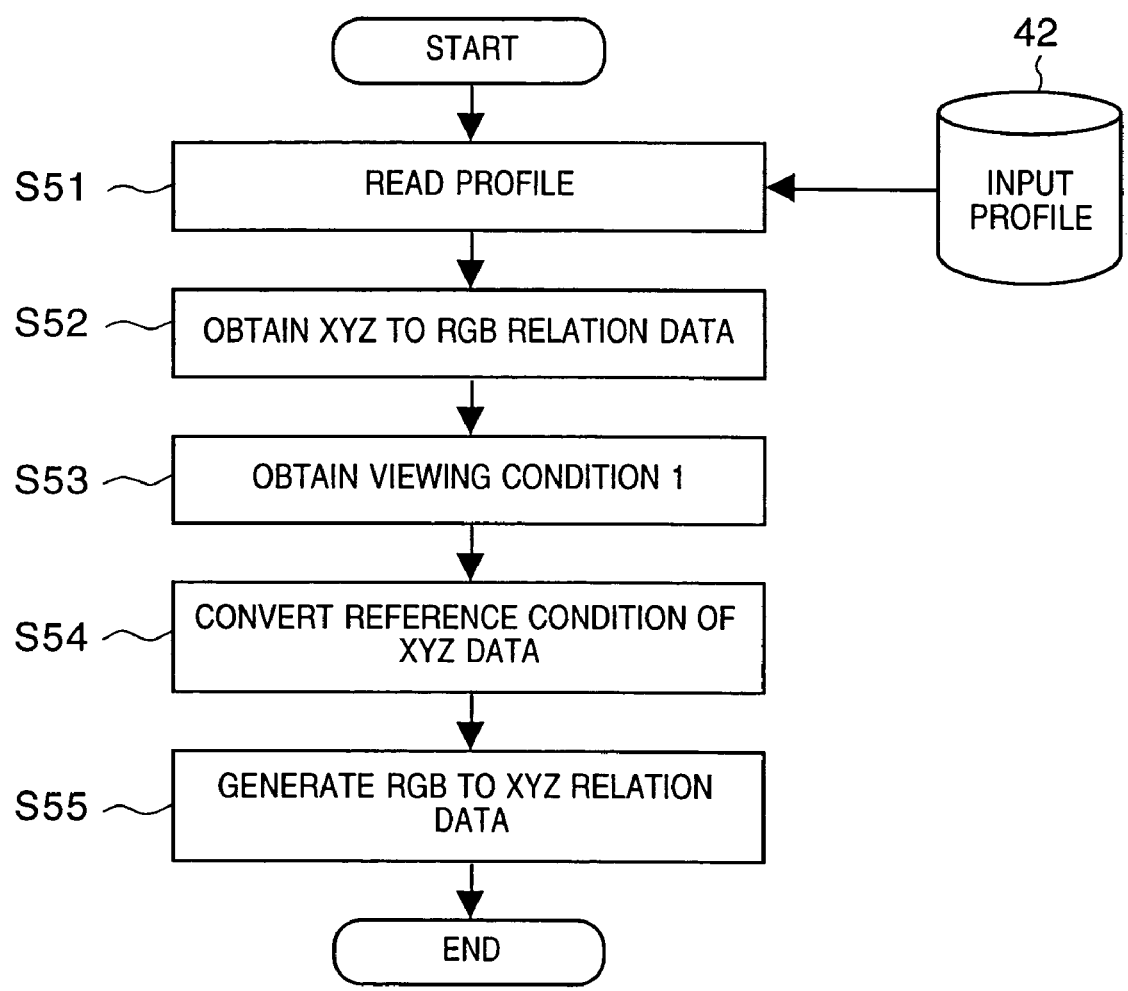
FIG. 4 is a flowchart showing the process of reconstructing a conversion LUT which corresponds to an ambient light.

FIG. 4 is a flowchart showing the process of reconstructing the conversion LUT 11 which corresponds to an ambient light.

To reconstruct the conversion LUT 11 so as to correspond to an ambient light, a profile designated by a user is read from the input profile 42 in step S51. XYZ values (or Lab values) of the color target and XYZ-to-RGB relation data, which associates the XYZ values with RGB values for a case of reading the color target by an input device, are stored in advance in the profile. The XYZ-to-RGB relation data is obtained from the profile in step S52. Since the profile includes a viewing condition 1, the viewing condition 1 is obtained from the profile in step S53.

The XYZ values of the XYZ-to-RGB relation data, obtained in step S52, employ as a reference, D50 or D65 indicative of a reference light at the time of colorimetry of the color target. Therefore, the XYZ values of the colorimetric illuminant reference must be corrected to XYZ values of an ambient light reference. In step S54, by using the color appearance model, the XYZ values of the colorimetric illuminant reference are converted to the color perception space JCH based on a colorimetric condition, i.e., the white point of D50 illuminant, an illuminance level, and the state of ambient light, and then the converted values in the color perception space JCH are converted back to XYZ values based on the viewing condition 1 different from the colorimetric condition, e.g., the white point of D65 illuminant, an illuminance level, and the state of ambient light. By this, XYZ values of the ambient light reference are obtained. In the foregoing manner, the relation between XYZ values of the ambient light reference and device RGB values is obtained. In step S55, an RGB-to-XYZ conversion matrix is generated based on the RGB-to-XYZ relation data and optimized by repetition or the like, thereby obtaining the conversion LUT 11 which corresponds to the viewing condition 1.

Figure 5:
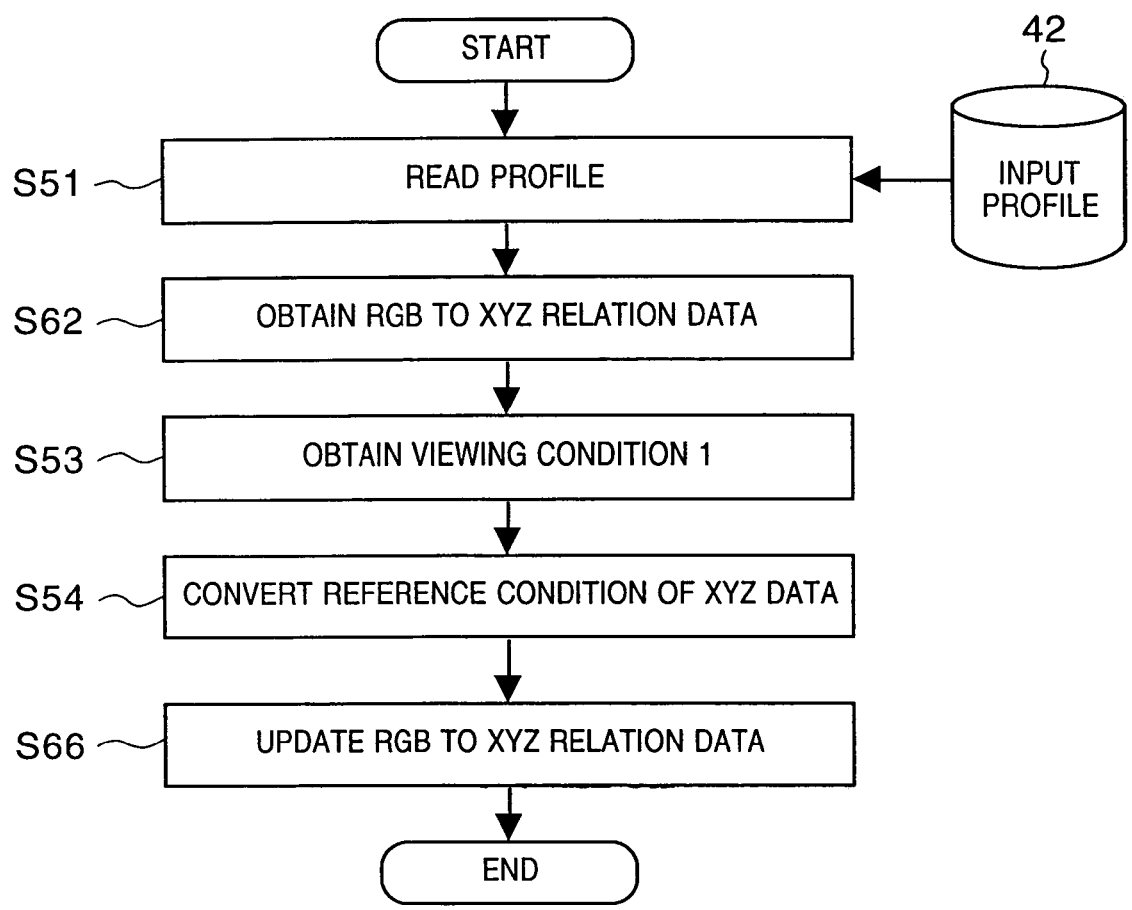
FIG. 5 is a flowchart showing the process of updating a conversion LUT so as to correspond to an ambient light.

FIG. 5 is a flowchart showing the process of updating the conversion LUT, stored in the input profile 42, to the conversion LUT 11 which corresponds to an ambient light. Note that the steps in FIG. 5 executing the same processing as those in FIG. 4 have the same reference step number, and detailed description thereof is omitted.

Generally in the ICC profile for an input device, a conversion matrix (colorant Tag) for performing RGB-to-XYZ conversion, or a conversion LUT (AtoB0 Tag) is stored. Thus, the RGB-to-XYZ relation data is obtained from the profile in step S62.

In step S54, the relation between XYZ values of the ambient light reference and device RGB values is obtained. Then in step S66, the conversion matrix (colorant Tag) or conversion LUT (AtoB0 Tag) in the profile is updated. As a result, a conversion LUT, updated to the conversion LUT 11 corresponding to the viewing condition 1, is obtained.

Moreover, although FIGS. 4 and 5 provide an example of utilizing the RGB-to-XYZ relation data, the present invention is not limited to this, but may utilize other device-independent color data such as RGB-to-Lab relation data.

[Selecting Gamut Mapping Mode and Performing Gamut Mapping]

A gamut mapping mode is selected by a user through a user interface, or automatically selected by Rendering Intent included in the header of a source profile. The following selection is made in the automatic selection according to the profile.

Perceptual—gamut mapping mode in JCH color space

Relative Colorimetric—gamut mapping mode in JCH color space

Saturation—gamut mapping mode in JCH color space

Absolute Colorimetric—gamut mapping mode in QMH color space

In other words, in a case of relative color matching, JCH space 13 is selected, while in a case of absolute color matching, QMH space 14 is selected.

Figure 6:
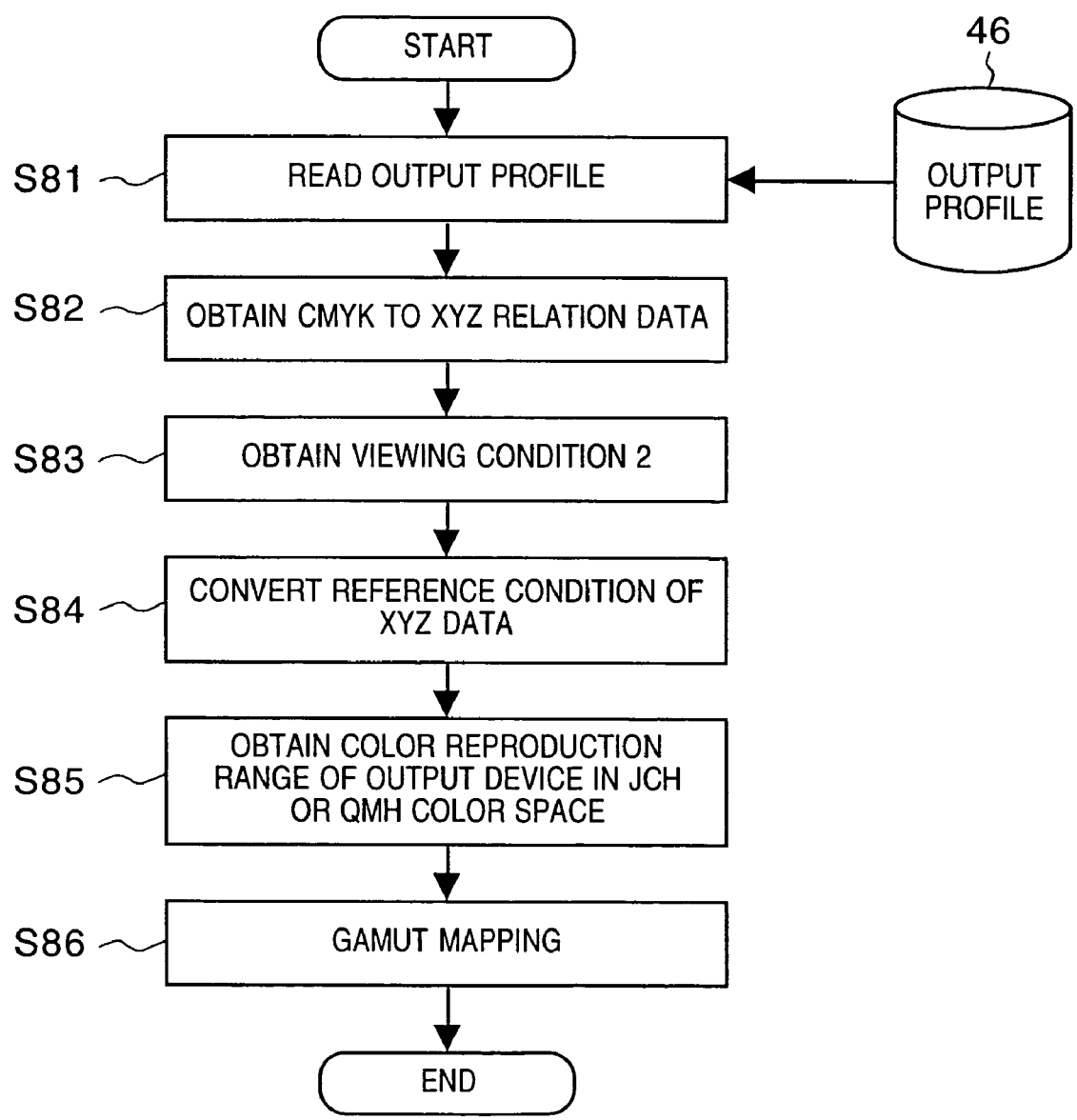
FIG. 6 is a flowchart showing the process of performing gamut mapping in the color space JCH or QMH.

FIG. 6 is a flowchart showing the process of performing the gamut mapping in the color perception space JCH 13 or color perception space QMH 14.

In order to perform the gamut mapping in a color perception space, a profile designated by a user is read from the output profile 46 in step S81.

Generally in the ICC profile for an output device, a judgment LUT (gamut Tag), to which XYZ values or Lab values are inputted, is stored in order to judge inside or outside the color reproduction range (hereinafter referred to as inside/outside judgment of the color reproduction range). However, because the XYZ values employ D50 or D65 which is the characteristic of colorimetric illuminant as a reference, the XYZ values cannot be used directly to make judgment of inside/outside the color reproduction range according to an ambient light. Therefore, instead of using the judgment LUT (gamut Tag) which judges inside/outside the color reproduction range, CMYK-to-XYZ relation data is obtained in step S82 from the conversion LUT (AtoB0 Tag or the like), stored in the profile for CMYK-to-XYZ conversion. Since the profile includes the viewing condition 2, the viewing condition 2 is obtained from the profile in step S83.

The XYZ values of the CMYK-to-XYZ relation data, obtained in step S82, employ as a reference, D50 or D65 indicative of a colorimetric light. Therefore, the XYZ values of the colorimetric illuminant reference must be corrected to XYZ values of an ambient light reference. In step S84, by using the color appearance model, the XYZ values of the colorimetric illuminant reference are converted to the color perception space JCH based on a colorimetric condition, i.e., the white point of D50 illuminant, an illuminance level, and the state of ambient light, and then the converted values in the color perception space JCH are converted back to XYZ values based on the viewing condition 2 different from the colorimetric condition, e.g., the white point of D65 illuminant, an illuminance level, and the state of ambient light. By this, XYZ values of the ambient light reference are obtained. In the foregoing manner, the relation between the device CMYK values and XYZ values of the ambient light reference is obtained in step S84. In step S85, a color reproduction range of an output device in the JCH or QMH color space is obtained based on the CMYK-to-ambient-light-XYZ relation data obtained in step S84.

The color reproduction range of an output device in the JCH or QMH color space is obtained as follows. XYZ values of an ambient light reference on the following eight points, shown as an example, are obtained by using the CMYK-to-ambient-light-XYZ relation data obtained in step S84.

| | |
|---|---|
| Red | (C: 0%, M: 100%, Y: 100%, K: 0%) |
| Yellow | (C: 0%, M: 0%, Y: 100%, K: 0%) |
| Green | (C: 100%, M: 0%, Y: 100%, K: 0%) |
| Cyan | (C: 100%, M: 0%, Y: 0%, K: 0%) |
| Blue | (C: 100%, M: 100%, Y: 0%, K: 0%) |
| Magenta | (C: 0%, M: 100%, Y: 0%, K: 0%) |
| White | (C: 0%, M: 0%, Y: 0%, K: 0%) |
| Black | (C: 0%, M: 0%, Y: 0%, K: 100%) |

Figure 7:
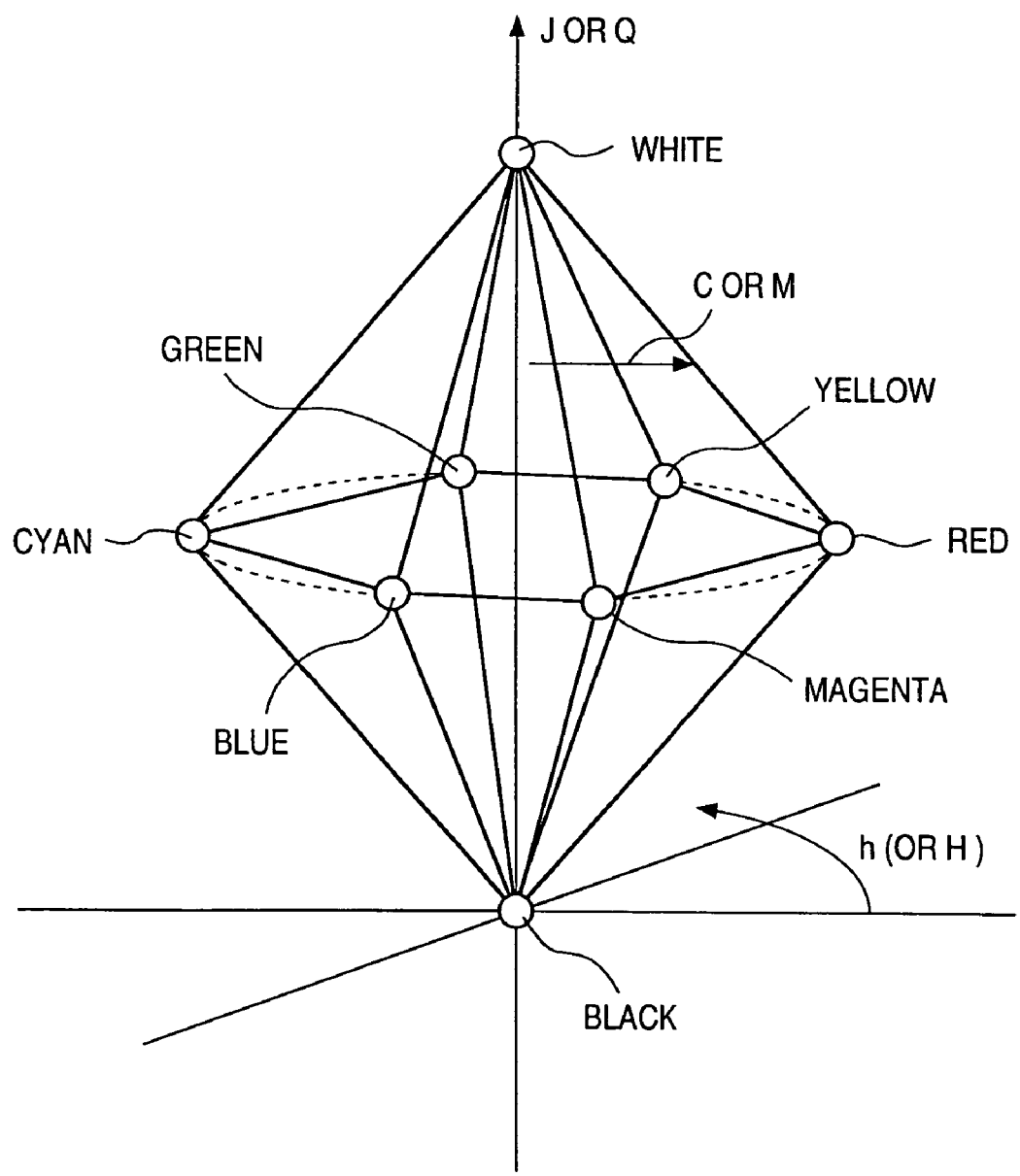
FIG. 7 shows a dodecahedron for approximating a color reproduction range.

Then, the obtained XYZ values are converted to coordinate values in the color perception space JCH or QMH based on the viewing condition 2 by using the color appearance model. By this, the color reproduction range of the output device can be approximated by a dodecahedron shown in FIG. 7.

In the color reproduction range approximated by the dodecahedron, for instance, if an intermediate point between White and Black on an achromatic color axis and a point represented by JCH values or QMH values of an input color signal subjected to inside/outside judgment exist in the same side, it is judged that the input color signal is inside the color reproduction range, while if these points exist in the opposite sides, it is judged that the input color signal is outside the color reproduction range.

Figure 8A:
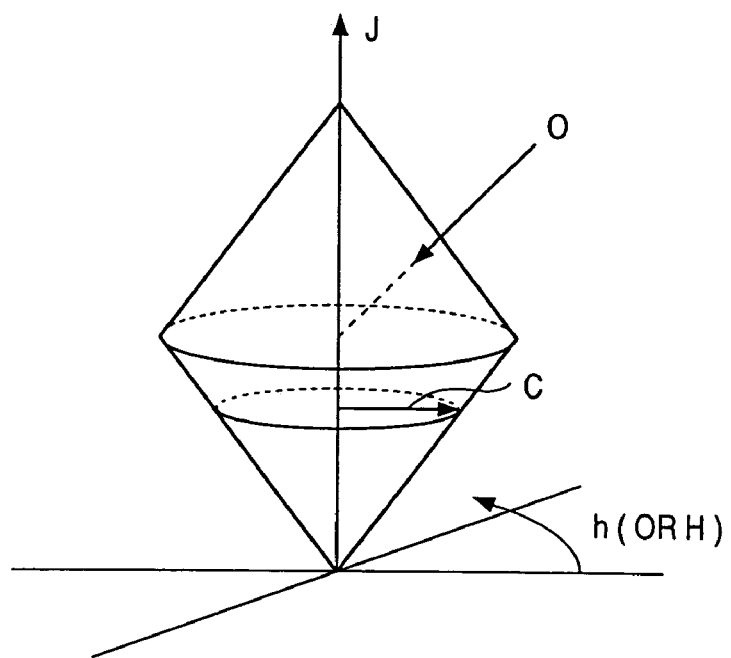
FIGS. 8A and 8B are conceptual views of gamut mapping in the JCH color perception space.
Figure 8B:
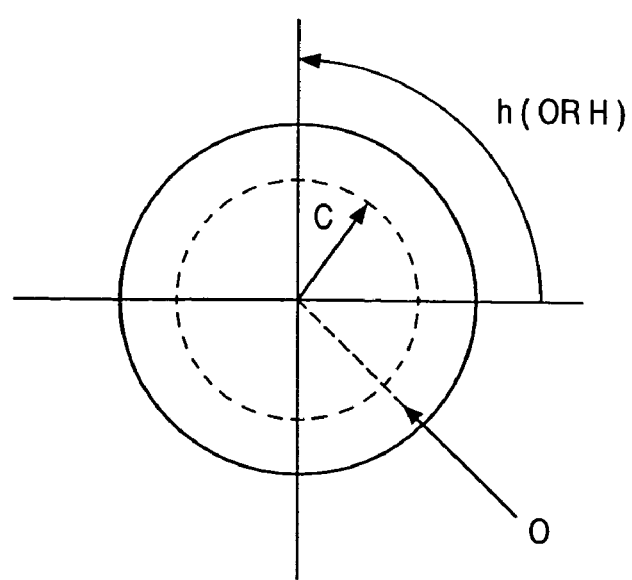
Figure 9A:
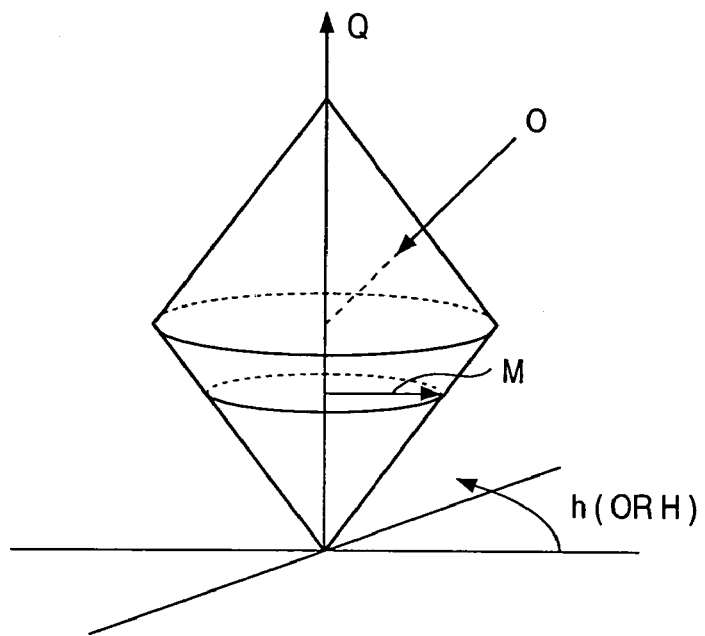
FIGS. 9A and 9B are conceptual views of gamut mapping in the QMH color perception space.
Figure 9B:
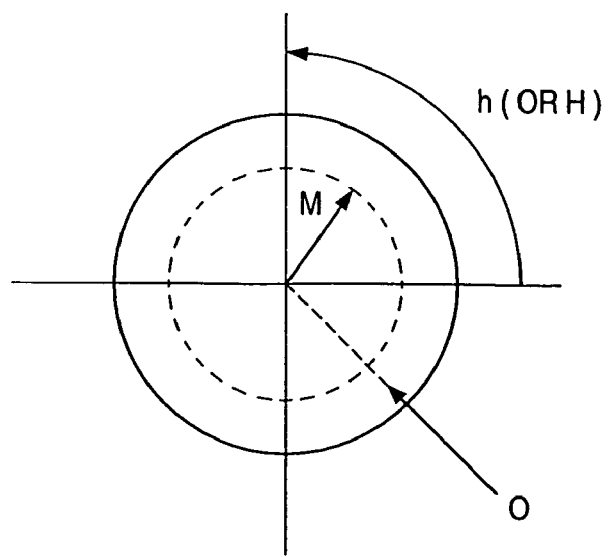

Based on the result of inside/outside judgment of the color reproduction range in step S85, the gamut mapping is performed in step S86. FIGS. 8A and 8B are conceptual views of the gamut mapping in the JCH color perception space. FIGS. 9A and 9B are conceptual views of the gamut mapping in the QMH color perception space. If an input color signal is judged as being outside the color reproduction range of the output device in the aforementioned inside/outside judgment, the input color signal is mapped in the color reproduction range such that a hue angle h (or H) is preserved in the JCH color perception space or QMH color perception space. The mapping result is stored in the LUT for the JCH color perception space in a case of relative color matching, or stored in the LUT for the QMH color perception space in a case of absolute color matching.

Figure 10A:
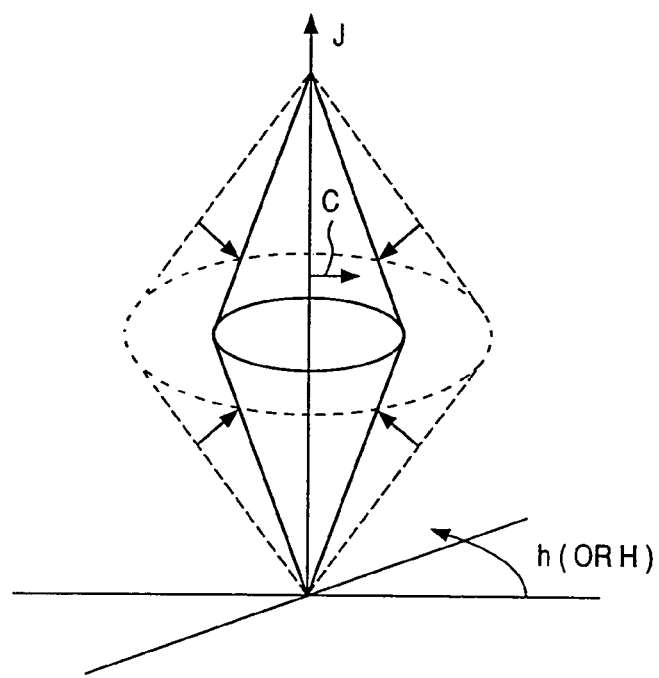
FIGS. 10A and 10B are conceptual views of gamut mapping performed between different devices.
Figure 10B:
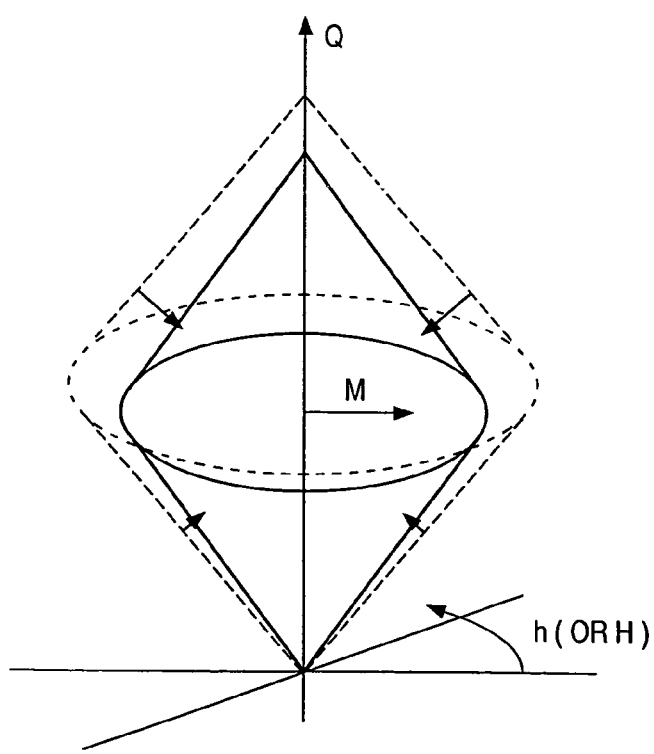

FIGS. 10A and 10B are conceptual views of the gamut mapping performed between different devices. In the drawings, the broken lines indicate a color reproduction range of an input device, and the solid lines indicate a color reproduction range of an output device. In the JCH color perception space, the level of J (lightness) is normalized respectively by illuminant white points under the viewing conditions 1 and 2 (hereinafter referred to as "white point 1" and "white point 2"). Thus, J does not depend on the illuminance levels of the viewing conditions 1 and 2 (hereinafter referred to as "illuminance level 1" and "illuminance level 2"). On the other hand, in the QMH color perception space, the level of Q (brightness) changes in accordance with the illuminance levels 1 and 2. Therefore, in the relative color matching, the white point 1 becomes the white point 2. Meanwhile in the absolute color matching, if illuminance level 1>illuminance level 2, the white point 1 is mapped to the white point 2. If illuminance level 1<illuminance level 2, the white point 1 is outputted in gray color because the white point 1 is lower than white point 2.

[Generating Data Dependent on Viewing Condition 2]

Next, the conversion LUT 16 is generated by the data generation portion 47.

Figure 11:
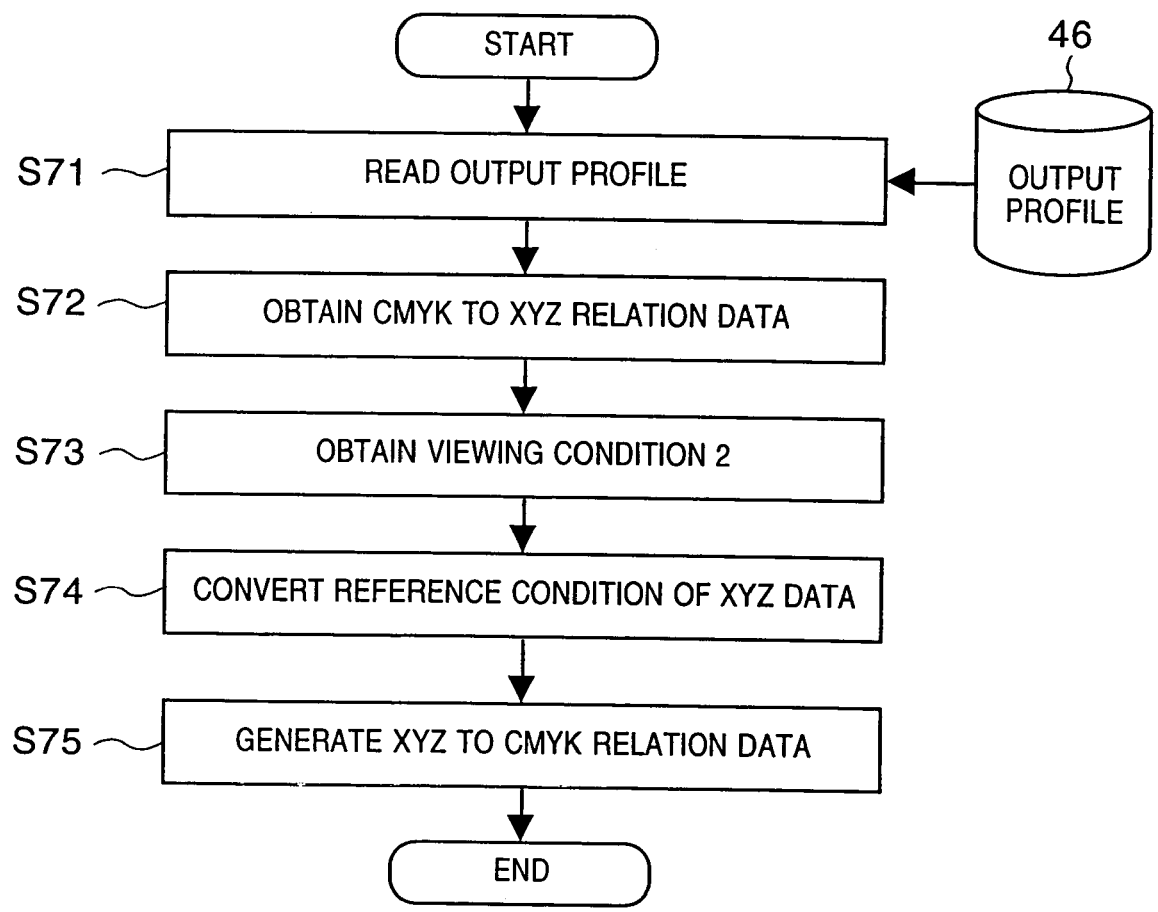
FIG. 11 is a flowchart showing the process of reconstructing a conversion LUT which corresponds to an ambient light.

FIG. 11 is a flowchart showing the process of reconstructing the conversion LUT 16 which corresponds to an ambient light.

Generally in the ICC profile for an output device, a LUT (BtoA0 Tag or the like) for converting XYZ or Lab values to device CMYK or RGB values is stored in the form including information of the gamut mapping. However, since the XYZ values inputted to the LUT employ D50 or D65 as a reference, the XYZ values cannot be directly used as a conversion LUT which corresponds to an ambient light.

As similar to the gamut mapping processing, a conversion LUT (AtoB0 Tag or the like) for performing CMYK-to-XYZ conversion is read from the output profile 46 in step S71, and CMYK-to-XYZ relation data is obtained from the conversion LUT in step S72. Note that CMYK values of the CMYK-to-XYZ relation data may be other device-dependent colors such as RGB values or the like, and XYZ values may be other device-independent colors such as Lab values or the like. In step S73, the viewing condition 2 is obtained from the output profile 46 which stores the viewing condition 2 in advance.

The XYZ values of the obtained CMYK-to-XYZ relation data employ D50 or D65 as a reference. Therefore, the XYZ values of the colorimetric illuminant reference must be corrected to XYZ values of an ambient light reference in step S74. More specifically, by using the color appearance model, the XYZ values of the colorimetric illuminant reference are converted to the color perception space JCH based on a colorimetric condition, i.e., the white point of D50 illuminant, an illuminance level, and the state of ambient light, and then the converted values in the color perception space JCH are converted back to XYZ values based on the viewing condition 2 different from the colorimetric condition, e.g., the white point of D65 illuminant, an illuminance level, and the state of ambient light. By this, XYZ values of the ambient light reference are obtained. In the foregoing manner, the relation between the device CMYK values and XYZ values of the ambient light reference is obtained. In step S75, ambient light XYZ-to-CMYK relation data is optimized by repetition or the like, using the CMYK-to-ambient-light-XYZ relation data, thereby obtaining the conversion LUT 16 which corresponds to a desired ambient light.

[Executing Color Matching]

Figure 12:
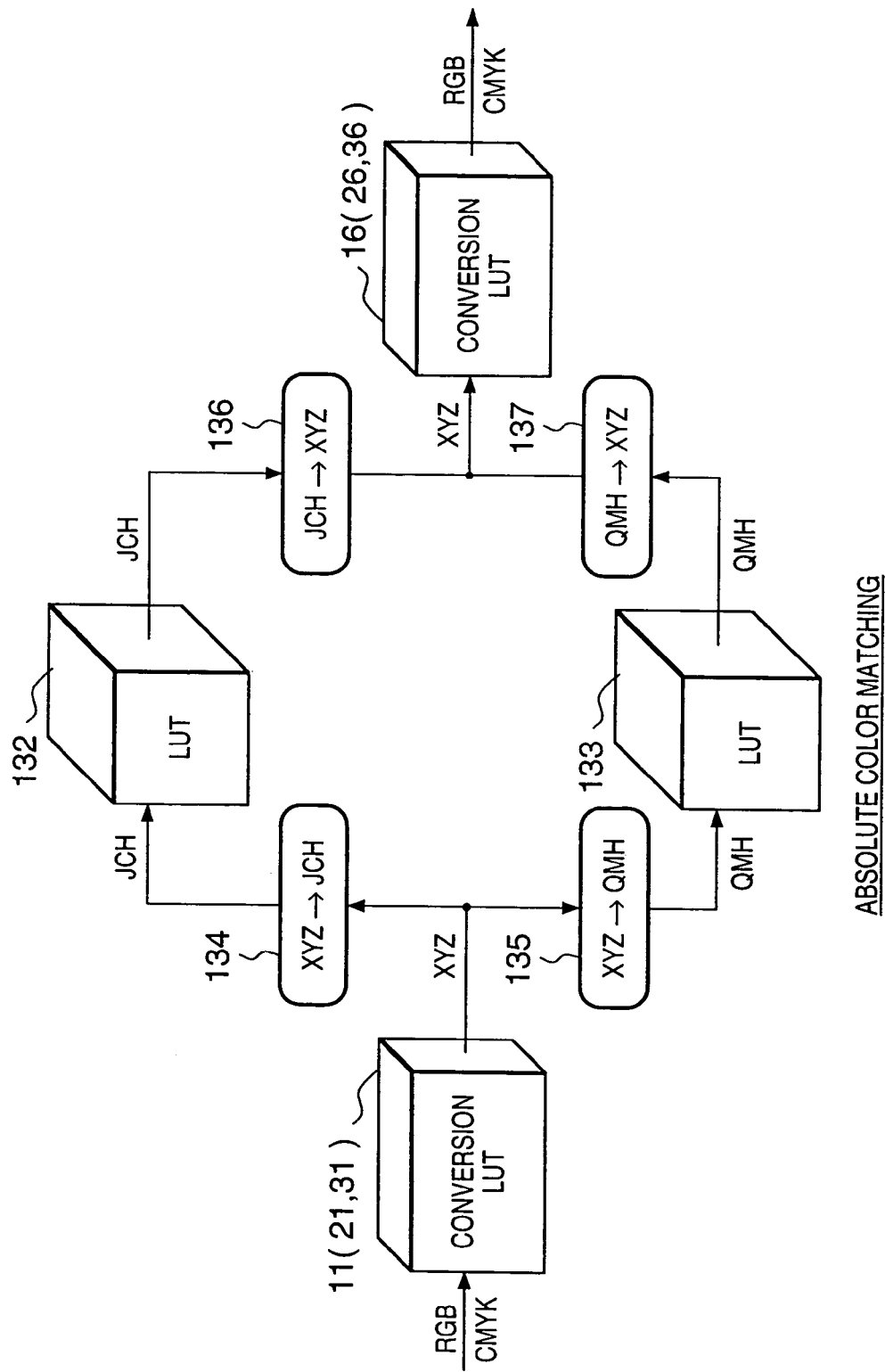
FIG. 12 is a conceptual view of color matching processing.

FIG. 12 is a conceptual view of color matching processing. Reference numeral 11 denotes a conversion LUT generated based on the viewing condition 1 by the data generation portion 41; 132, a LUT generated in the JCH color space by the gamut mapping portion 44; 133, a LUT generated in QMH color space by the gamut mapping portion 45; and 16, a conversion LUT generated based on the viewing condition 2 by the data generation portion 47.

RGB or CMYK input color signals are converted by the conversion LUT 11 from the input-device-dependent color signals to XYZ signals which are device-independent signals under the viewing condition 1. Next, the XYZ signals are converted by color appearance model forward converters 134 and 135 to perception signals JCH or QMH, based on the viewing condition 1, such as the white point of D50 illuminant, an illuminance level, and the state of ambient light. In a case of relative color matching, JCH space is selected, while in a case of absolute color matching, QMH space is selected.

The color perception signals JCH and QMH are mapped to a color reproduction range of the output device by the LUT 132 and 133. The color perception signals JCH and QMH, where the gamut mapping has been performed, are converted by color appearance model inverse converters 136 and 137 to XYZ signals which are device-independent signals under the viewing condition 2, based on the viewing condition 2, such as the white point of D65 illuminant, an illuminance level, and the state of ambient light. Then, XYZ signals are converted to output-device-dependent color signals under the viewing condition 2 by the conversion LUT 134.

The RGB or CMYK signals obtained by the above processing are sent to the output device, and an image represented by the color signals is printed. When the printout is viewed under the viewing condition 2, the colors of the printout are perceived as the same as the original document viewed under the viewing condition 1.

<Second Embodiment>

Hereinafter, described as a second embodiment is an example of color matching utilizing an input profile and monitor profile shown in FIG. 13. Note that the construction and processing similar to that of the first embodiment will not be described in detail.

[Generating Data Dependent on Viewing Condition 1]

Figure 13:
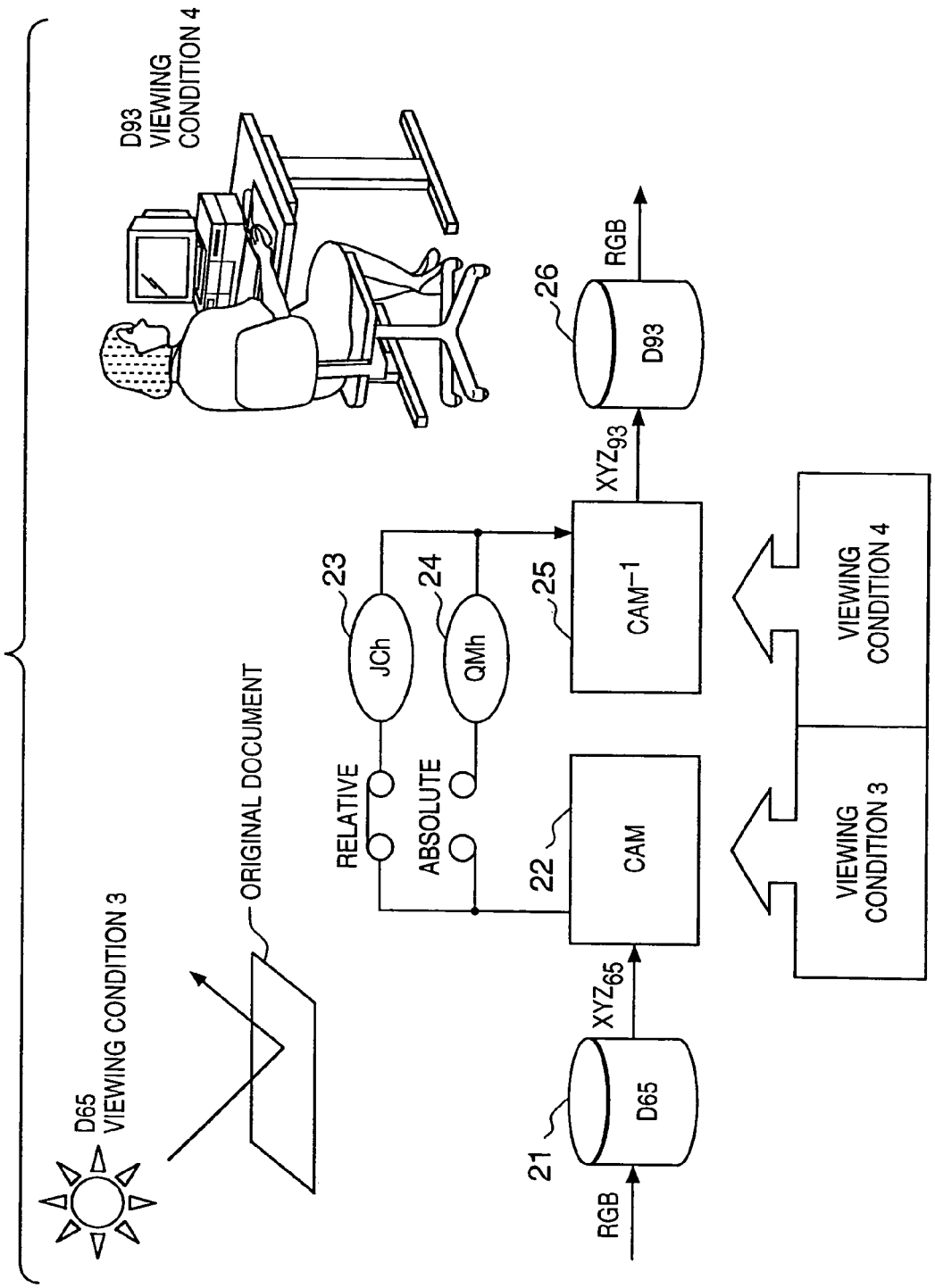
FIG. 13 is a conceptual view of color matching according to a second embodiment of the present invention.

A conversion LUT 21 shown in FIG. 13 is generated by the data generation portion 41 in the same method as described in the first embodiment, i.e., the processing shown in FIGS. 4 and 5.

[Selecting Gamut Mapping Mode and Performing Gamut Mapping]

Since the selection of a gamut mapping mode is performed in the same manner as that of the first embodiment, detailed description will not be provided.

Figure 14:
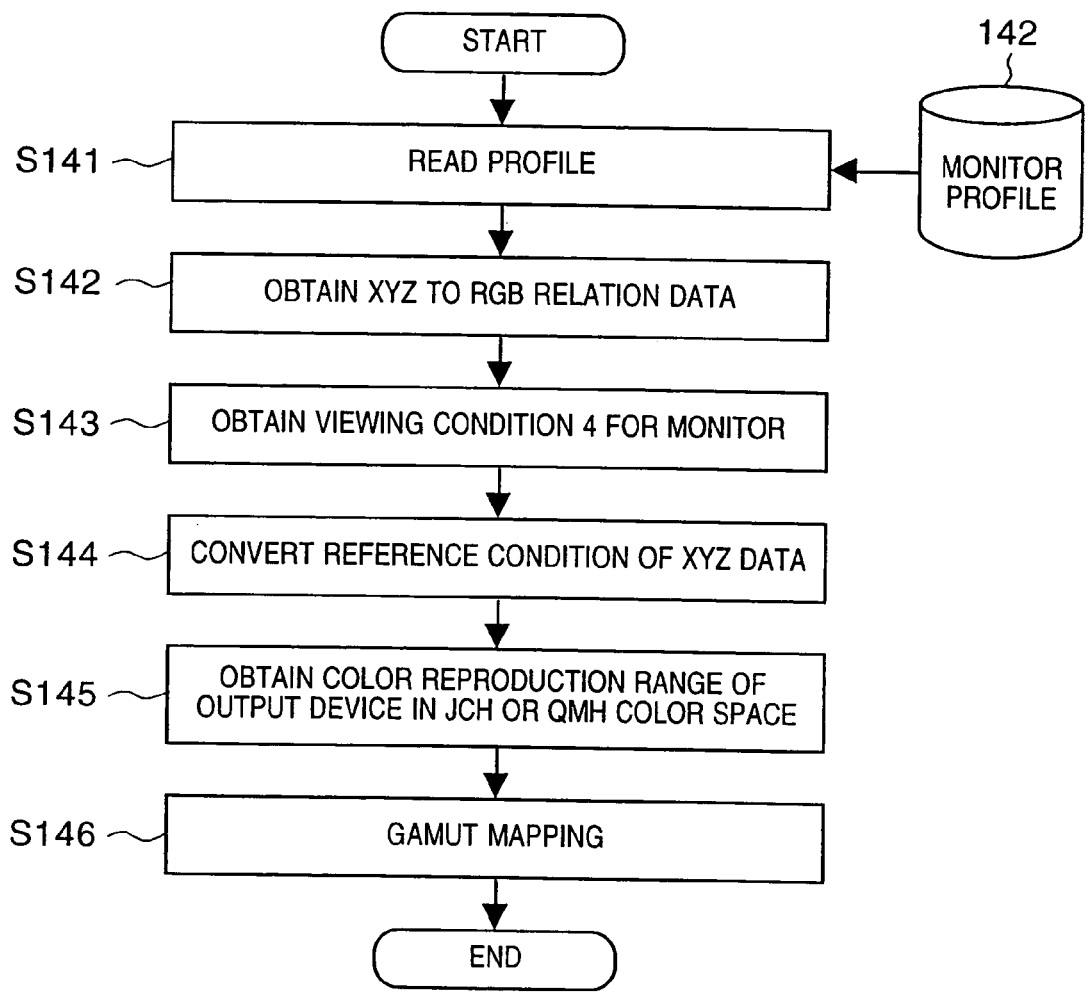
FIG. 14 is a flowchart showing the process of performing gamut mapping in the color space JCH or QMH according to the second embodiment.

FIG. 14 is a flowchart showing the process of performing the gamut mapping in the color perception space JCH 23 or color perception space QMH 24 shown in FIG. 13.

To perform the gamut mapping in a color perception space, a profile designated by a user is read from a monitor profile 142 in step S141.

Generally in the ICC profile for a monitor device, a judgment LUT (gamut Tag), to which XYZ values or Lab values are inputted, is often stored in order to make inside/outside judgement of the color reproduction range. However, because the XYZ values employ D50 or D65 which is the characteristic of colorimetric illuminant as a reference, the XYZ values cannot be used directly to make judgment of inside/outside the color reproduction range according to an ambient light. Therefore, instead of using the judgment LUT (gamut Tag) which judges inside/outside the color reproduction range, RGB-to-XYZ relation data is obtained in step S142 from a conversion matrix (colorant Tag) or conversion LUT (AtoB0 Tag or the like), stored in the profile for RGB-to-XYZ conversion. Since the monitor profile includes a monitor viewing condition 4, the viewing condition 4 is obtained from the monitor profile in step S143. Note that XYZ values of the RGB-to-XYZ relation data may be other device-independent color values such as Lab values.

The XYZ values of the RGB-to-XYZ relation data, obtained in step S142, employ D50 indicative of a colorimetric light, or a monitor's white point as a reference. Therefore, the XYZ values of the colorimetric illuminant reference must be corrected to XYZ values of an ambient light reference. In step S144, by using the color appearance model, the XYZ values of the colorimetric illuminant reference are converted to the color perception space JCH based on a colorimetric condition, i.e., the white point of D50 illuminant, a luminance level, and the state of ambient light, and then the converted values in the color perception space JCH are converted back to XYZ values based on the viewing condition 4 different from the colorimetric condition, e.g., the white point of D93 illuminant, a luminance level, and the state of ambient light. By this, XYZ values of the ambient light reference are obtained. In the foregoing manner, the relation between the device RGB values and XYZ values of the ambient light reference is obtained. In step S145, a color reproduction range of a monitor device in the JCH or QMH color space is obtained.

The color reproduction range of a monitor device is obtained as follows. XYZ values of an ambient light reference on the following eight points, shown as an example, are obtained by the conversion processing of XYZ reference condition in step S144.

| | |
|---|---|
| Red | (R: 255, G: 0, B: 0) |
| Yellow | (R: 255, G: 255, B: 0) |
| Green | (R: 0, G: 255, B: 0) |
| Cyan | (R: 0, G: 255, B: 255) |
| Blue | (R: 0, G: 0, B: 255) |
| Magenta | (R: 255, G: 0, B: 255) |
| White | (R: 255, G: 255, B: 255) |
| Black | (R: 0, G: 0, B: 0) |

Then, the obtained XYZ values are converted to coordinate values in the color perception space JCH or QMH based on the viewing condition 4 by using the color appearance model. By this, the color reproduction range of the monitor device can be approximated by a dodecahedron shown in FIG. 7. In the color reproduction range approximated by the dodecahedron, for instance, if an intermediate point between White and Black on an achromatic color axis and a point represented by JCH values or QMH values of an input color signal subjected to inside/outside judgment exist in the same side, it is judged that the input color signal is inside the color reproduction range, while if these points exist in the opposite sides, it is judged that the input color signal is outside the color reproduction range.

Based on the result of inside/outside judgment of the color reproduction range in step S145, the gamut mapping is performed in step S146. FIGS. 8A and 8B are conceptual views of the gamut mapping in the JCH color perception space. FIGS. 9A and 9B are conceptual views of the gamut mapping in the QMH color perception space. If an input color signal is judged as being outside the color reproduction range of the output device in the aforementioned inside/outside judgment, the input color signal is mapped in the color reproduction range such that a hue angle h (or H) is preserved in the JCH color perception space or QMH color perception space. The color reproduction range obtained in step S146 is stored in the LUT for the JCH color perception space in a case of relative color matching, or stored in the LUT for the QMH color perception space in a case of absolute color matching.

FIGS. 10A and 10B are conceptual views of the gamut mapping performed between different devices. In the drawings, the broken lines indicate a color reproduction range of an input device, and the solid lines indicate a color reproduction range of an output device. In the JCH color perception space, the level of J (lightness) is normalized respectively by illuminant white points under the viewing conditions 1 and 4 (hereinafter referred to as "white point 1" and "white point 4"). Thus, J does not depend on the illuminance level of the viewing condition 1 and luminance level of the viewing condition 4 (hereinafter referred to as "illuminance level 1" and "luminance level 4"). On the other hand, in the QMH color perception space, the level of Q (brightness) changes in accordance with the illuminance level 1 and luminance level 4. Therefore, in the relative color matching, the white point 1 becomes the white point 4. Meanwhile in the absolute color matching, if illuminance level 1>luminance level 4, the white point 1 is mapped to the white point 4. If illuminance level 1<luminance level 4, the white point 1 is outputted in gray color because the white point 1 is lower than white point 4.

[Generating Data Dependent on Viewing Condition 4]

Next, the conversion LUT 26 shown in FIG. 13 is generated by the data generation portion 47.

Figure 15:
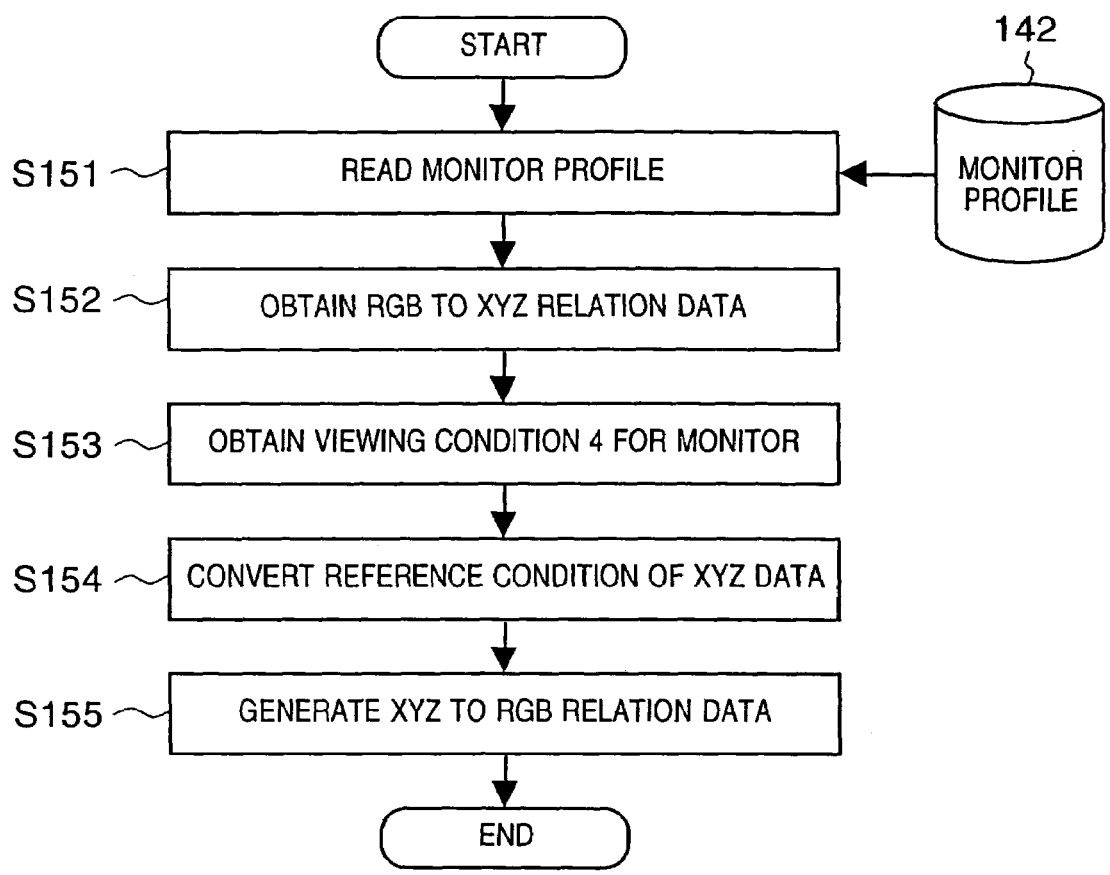
FIG. 15 is a flowchart showing the process of reconstructing a conversion LUT which corresponds to an ambient light according to the second embodiment.

FIG. 15 is a flowchart showing the process of reconstructing the conversion LUT 26 which corresponds to an ambient light.

In the ICC profile for a monitor device, there are cases in which a LUT (BtoA0 Tag or the like) for converting XYZ to device RGB values is stored in the form including information of the gamut mapping. However, since the XYZ values inputted to the LUT employ D50 or D65 as a reference, the XYZ values cannot be directly used as a conversion LUT which corresponds to an ambient light.

As similar to the gamut mapping processing, a conversion matrix (colorant Tag) or a conversion LUT (AtoB0 Tag or the like) for performing RGB-to-XYZ conversion is read from the monitor profile 142 in step S151, and RGB-to-XYZ relation data is obtained from the conversion LUT in step S152. Note that XYZ values of the RGB-to-XYZ relation data may be other device-independent color values, such as Lab values or the like. In step S153, the viewing condition 4 is obtained from the monitor profile 142 which stores the viewing condition 4 in advance.

The XYZ values of the obtained RGB-to-XYZ relation data employ D50 or monitor's white point as a reference. Therefore, the XYZ values of the colorimetric illuminant reference must be corrected to XYZ values of an ambient light reference in step S154. More specifically, by using the color appearance model, the XYZ values of the colorimetric illuminant reference are converted to the color perception space JCH based on a colorimetric condition (the white point of D50 illuminant, a luminance level, and the state of ambient light), and then the converted values in the color perception space JCH are converted back to XYZ values based on the viewing condition 4 (the white point of D93 illuminant, a luminance level, and the state of ambient light) which is different from the colorimetric condition. By this, XYZ values of the colorimetric illuminant reference are converted to XYZ values of the ambient light reference. In the foregoing manner, the relation between the device RGB values and XYZ values of the ambient light reference is obtained. In step S155, the RGB-to-XYZ conversion is formulated into a model such as a conversion matrix and optimized by repetition or the like, thereby obtaining the conversion LUT 26 which corresponds to a desired ambient light.

[Executing Color Matching]

FIG. 12 is a conceptual view of color matching processing. Reference numeral 21 denotes a conversion LUT generated based on the viewing condition 1 by the data generation portion 41; 132, a LUT generated in the JCH color space by the gamut mapping portion 44; 133, a LUT generated in QMH color space by the gamut mapping portion 45; and 26, a conversion LUT generated based on the viewing condition 4 by the data generation portion 47.

RGB input color signals are converted by the conversion LUT 21 from the input-device-dependent color signals to XYZ signals which are device-independent signals under the viewing condition 1. Next, the XYZ signals are converted by color appearance model forward converters 134 and 135 to perception signals JCH or QMH, based on the viewing condition 1, such as the white point of D50 illuminant, an illuminance level, and the state of ambient light. In a case of relative color matching, JCH space is selected, while in a case of absolute color matching, QMH space is selected.

The color perception signals JCH and QMH are mapped to a color reproduction range of the monitor device by the LUT 132 and 133. The color perception signals JCH and QMH, where the gamut mapping has been performed, are converted by color appearance model inverse converters 136 and 137 to XYZ signals which are device-independent signals under the viewing condition 4, based on the viewing condition 4, such as the white point of D93 illuminant, a luminance level, and the state of ambient light. Then, XYZ signals are converted to monitor-device-dependent color signals under the viewing condition 4 by the conversion LUT 26.

The RGB signals obtained by the above processing are sent to the monitor device, and an image represented by the color signals is displayed on the monitor device. When the displayed image is viewed under the viewing condition 4, the colors of the displayed image are perceived as the same as the original document viewed under the viewing condition 1.

<Third Embodiment>

Figure 16:
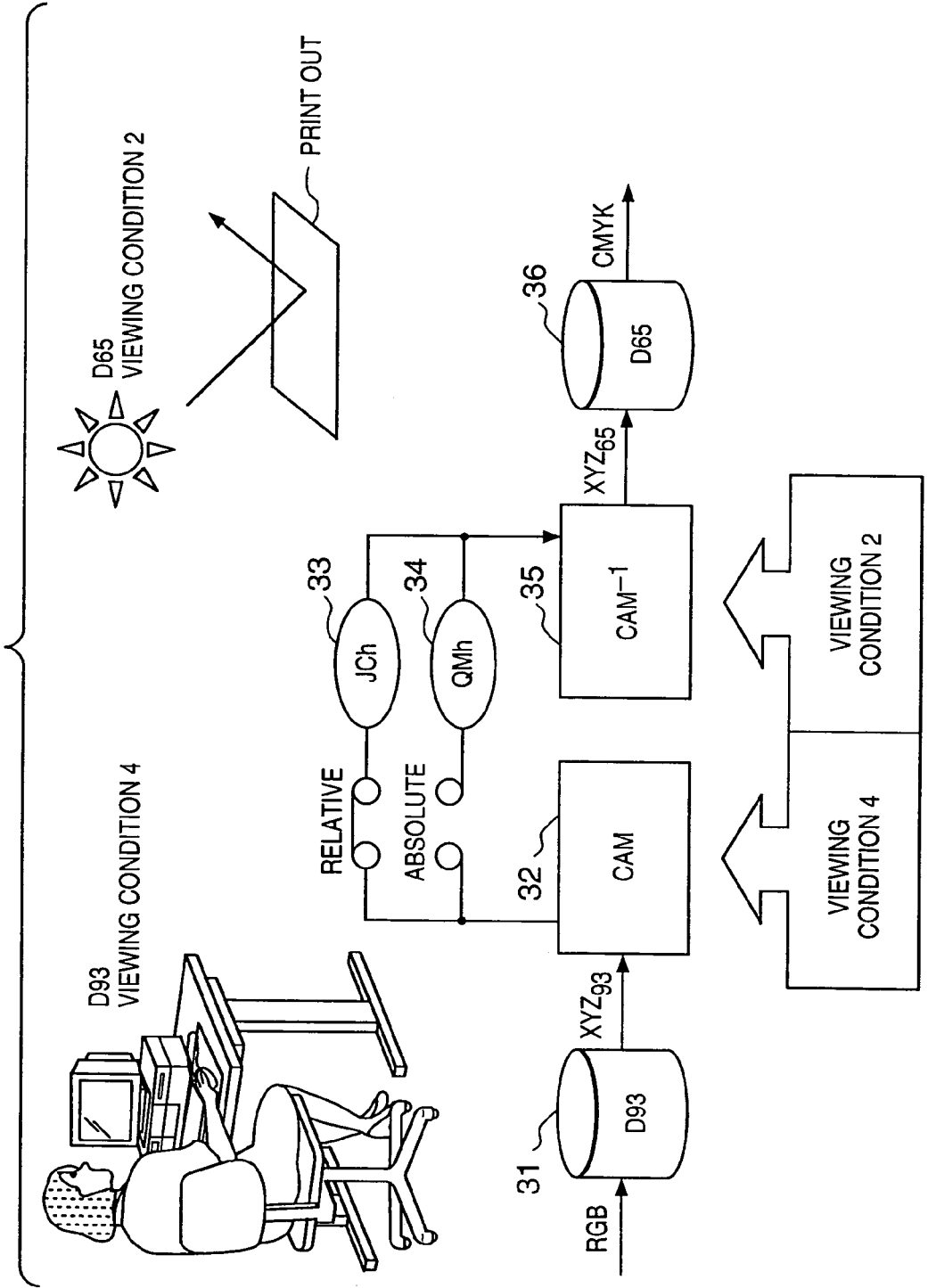
FIG. 16 is a conceptual view of color matching according to a third embodiment of the present invention.

Hereinafter, described as a third embodiment is an example of color matching utilizing a monitor profile and output profile shown in FIG. 16. Note that the construction and processing similar to that of the first and second embodiments will not be described in detail.

Figure 17:
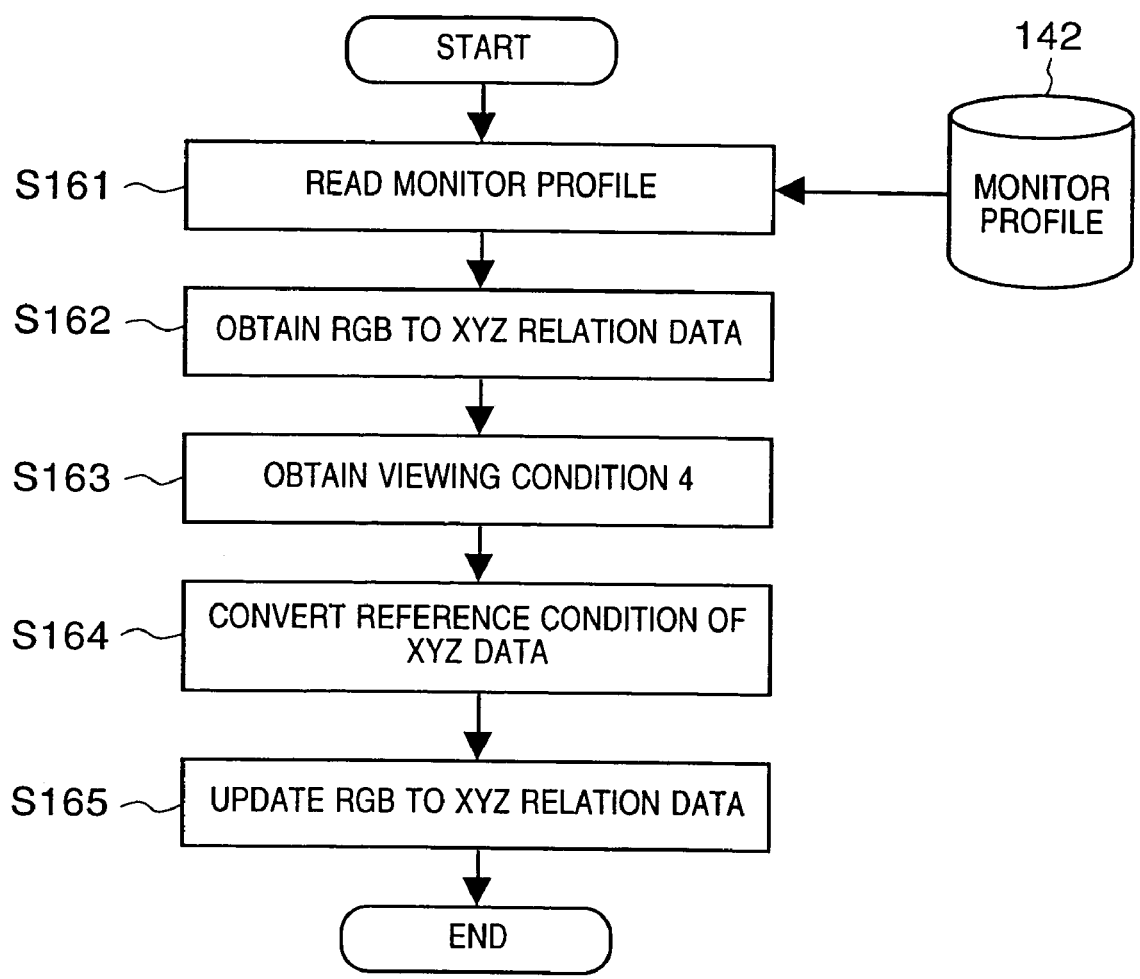
FIG. 17 is a flowchart showing the process of updating a conversion LUT so as to correspond to an ambient light in the second embodiment.

In the ICC profile for a monitor device, a conversion matrix (colorant Tag) or a conversion LUT (AtoB0 Tag) for performing RGB-to-XYZ conversion is stored. In step S162 in FIG. 17, RGB-to-XYZ relation data is obtained. Since the profile includes the viewing condition 4, the viewing condition 4 is obtained from the profile in step S163. Note that XYZ values of the RGB-to-XYZ relation data may be other device-independent color values such as Lab values.

The XYZ values of the obtained RGB-to-XYZ relation data employ D50 or monitor's white point as a reference. Therefore, the XYZ values of the colorimetric illuminant reference must be corrected to XYZ values of an ambient light reference in step S164. More specifically, by using the color appearance model, the XYZ values of the colorimetric illuminant reference are converted to the color perception space JCH based on a colorimetric condition (the white point of D50 illuminant, a luminance level, and the state of ambient light), and then the converted values in the color perception space JCH are converted back to XYZ values based on the viewing condition 4 (the white point of D93 illuminant, a luminance level, and the state of ambient light), which is different from the colorimetric condition. By this, XYZ values of the colorimetric illuminant reference are converted to XYZ values of the ambient light reference. In the foregoing manner, the relation between the device RGB values and XYZ values of the ambient light reference is obtained. In step S165, the conversion matrix (colorant Tag) or conversion LUT (AtoB0 Tag) in the monitor profile 142 is updated, thereby obtaining a conversion LUT 31 which corresponds to a desired ambient light.

[Selecting Gamut Mapping Mode and Performing Gamut Mapping]

Since the selection of a gamut mapping mode is performed in the same manner as that of the first embodiment, detailed description will not be provided. Furthermore, since the gamut mapping is also performed in the same manner as that described in the first embodiment shown in FIG. 6, detailed description will not be provided.

[Generating Data Dependent on Viewing Condition 2]

Next, a conversion LUT 36 is generated by the data generation portion 47. Since the processing is the same as that described in the first embodiment shown in FIG. 11, detailed description will not be provided.

[Executing Color Matching]

FIG. 12 is a conceptual view of color matching processing. Reference numeral 31 denotes a conversion LUT generated based on the viewing condition 4 by the data generation portion 41; 132, a LUT generated in the JCH color space by the gamut mapping portion 44; 133, a LUT generated in QMH color space by the gamut mapping portion 45; and 36, a conversion LUT generated based on the viewing condition 2 by the data generation portion 47.

RGB input color signals are converted by the conversion LUT 31 from the monitor-device-dependent color signals to XYZ signals which are device-independent signals under the viewing condition 4. Next, the XYZ signals are converted by color appearance model forward converters 134 and 135 to perception signals JCH or QMH, based on the viewing condition 4, such as the white point of D93 illuminant, a luminance level, and the state of ambient light. In a case of relative color matching, JCH space is selected, while in a case of absolute color matching, QMH space is selected.

The color perception signals JCH and QMH are mapped to a color reproduction range of the output device by the LUT 132 and 133. The color perception signals JCH and QMH, where the gamut mapping has been performed, are converted by color appearance model inverse converters 136 and 137 to XYZ signals which are device-independent signals under the viewing condition 2, based on the viewing condition 2, such as the white point of D65 illuminant, an illumination level, and the state of ambient light. Then, XYZ signals are converted to output-device-dependent color signals under the viewing condition 2 by the conversion LUT 36.

The CMYK signals obtained by the above processing are sent to the output device, and an image represented by the color signals is printed. When the printout is viewed under the viewing condition 2, the colors of the printout are perceived as the same as the image viewed under the viewing condition 4.

<Fourth Embodiment>

In each of the foregoing embodiments, descriptions have been provided for an example in which a color matching module CMM dynamically converts a profile, which has been generated from a colorimetric value employing D50 and D65 as a reference, into a profile which is dependent on a viewing condition. Instead, by generating a profile which is fixed to a viewing condition in advance, color matching corresponding to an ambient light can be performed.

Hereinafter described as a fourth embodiment is a method of generating a profile dependent on a viewing condition for selecting a corresponding profile from a plurality of profiles respectively corresponding to viewing conditions.

[Generating Profile Dependent on Viewing Condition in Data Source Side]

Data 11 for a conversion LUT, which is dependent on a viewing condition of the data source side, is generated based on a profile which has been generated from a colorimetric value employing D50 or D65 as a reference, by the processing similar to the processing of the data generation portion 41 shown in FIG. 3 for generating data dependent on the viewing condition of the data source side. Since the data 11 is a conversion matrix or a conversion LUT for converting device RGB (or CMYK) values to XYZ (or Lab) values under a viewing condition of the data source side, the data 11 may be stored in the profile without further processing, thereby forming a profile dependent on the viewing condition of the data source side.

[Generating Profile Dependent on Viewing Condition in Data Destination Side]

Data of the LUT 132 and 133 shown in FIG. 12 for performing the gamut mapping process in the JCH and QMH color spaces, which are dependent on a viewing condition of the data destination side, and data 16 for a conversion LUT, which is dependent on a viewing condition of the data destination side, are generated based on the profile which has been generated from a colorimetric value employing D50 or D65 as a reference, by the processing similar to the processing of the gamut mapping portions 44 and 45 and data generation portion 47 shown in FIG. 3.

Since the input/output color space for the data of the LUT 132 is in the JCH color space, the input color space must be XYZ (or Lab) values which base upon a viewing condition of the data destination side. To generate a conversion LUT for converting XYZ values under the viewing condition of the data destination side to CMYK (RGB) values for a device, CMYK values for the device, which correspond to the input XYZ values under the viewing condition of the data destination side, are obtained. In other words, XYZ values under the viewing condition of the data destination side are converted to color perception values JCH under the viewing condition of the data destination side by the color appearance model forward conversion, then compressed in the JCH color space by the data of the LUT 132. Then, the color perception values JCH are converted back to XYZ values under the viewing condition of the data destination side by the color appearance model inverse conversion, and conversion based on the data of the LUT 134 is performed. By this, CMYK values for a desired device are obtained. A conversion LUT can be generated by sequentially obtaining LUT grid points.

Similarly, since the input/output color space for the data of the LUT 133 is in the QMH color space, the input color space must be XYZ values which base upon a viewing condition of the data destination side. To generate a conversion LUT for converting XYZ values under the viewing condition of the data destination side to CMYK values for a device, CMYK values for the device, which correspond to the input XYZ values under the viewing condition of the data destination side, are obtained. In other words, XYZ values under the viewing condition of the data destination side are converted to color perception values QMH under the viewing condition of the data destination side by the color appearance model forward conversion, then compressed in the QMH color space by the data of the LUT 133. Then, the color perception values QMH are converted back to XYZ values under the viewing condition of the data destination side by the color appearance model inverse conversion, and conversion based on the data o the LUT 134 is performed. By this, CMYK values for a desired device are obtained. A conversion LUT can be generated by sequentially obtaining LUT grid points.

The LUT 132 is used in relative color matching, while the LUT 133 is used in absolute color matching. By storing these LUTs in a single profile, a profile which is dependent on the viewing condition of the data destination side can be generated. Herein, a plurality of LUTs for relative color matching can be produced and stored by the gamut mapping method (lightness preservation, chroma preservation or the like) in the JCH color space. Similarly, a plurality of LUTs for absolute color matching can be produced and stored by the gamut mapping method (brightness preservation, colorfulness preservation or the like) in the QMH color space.

[Executing Color Matching]

In the color matching using a profile dependent on a viewing condition, the gamut mapping process is included in the profile in the data destination side. Therefore, the gamut mapping in JCH color space or QMH color space does not need to be performed as described in each of the foregoing embodiments.

Color matching using a profile dependent on a viewing condition is described with reference to FIGS. 2, 13 and 16.

Input color signals are converted from device-dependent RGB (or CMYK) values to XYZ (or Lab) values under the viewing condition of the data source side, by the profile dependent on the viewing condition of the data source side.

Next, XYZ values under the viewing condition of the data source side are converted to JCH color space or QMH color space by the color appearance model forward conversion, and then converted back to XYZ values under the viewing condition of the data destination side by the color appearance model inverse conversion. Herein, selection of the JCH or QMH color space is determined by the gamut mapping mode. In a case of relative color matching, JCH color space is selected, while in a case of absolute color matching, QMH color space is selected. Furthermore, the conversion from XYZ values to JCH or QMH color space applies the viewing condition of the data source side, such as the white point of an illuminant, an illuminance level or luminance level, and the state of ambient light, stored in the profile in the data source side. In the inverse conversion, the viewing condition of the data destination side, such as the white point of an illuminant, an illuminance level or luminance level, and the state of ambient light, stored in the profile in the data source side, is employed. The converted XYZ (or Lab) values under the viewing condition of the data destination side are converted to the device CMYK (or RGB) values by the profile dependent on the viewing condition of the data destination side.

As has been described above, the color matching processing using a profile dependent on a viewing condition according to the fourth embodiment is equivalent to the color matching processing in the first to third embodiments.

<Fifth Embodiment>

In each of the foregoing embodiments, a profile dependent on a viewing condition is generated from one type of colorimetric value stored in advance in a profile. However, in order to improve matching precision, it is better that colorimetric data for plural illuminants are stored in the profile, then colorimetric data which is closest to the actual viewing condition is selected from the plural colorimetric data and converted to colorimetric data corresponding to the actual viewing condition, and a profile dependent on the viewing condition is generated.

Figure 20:
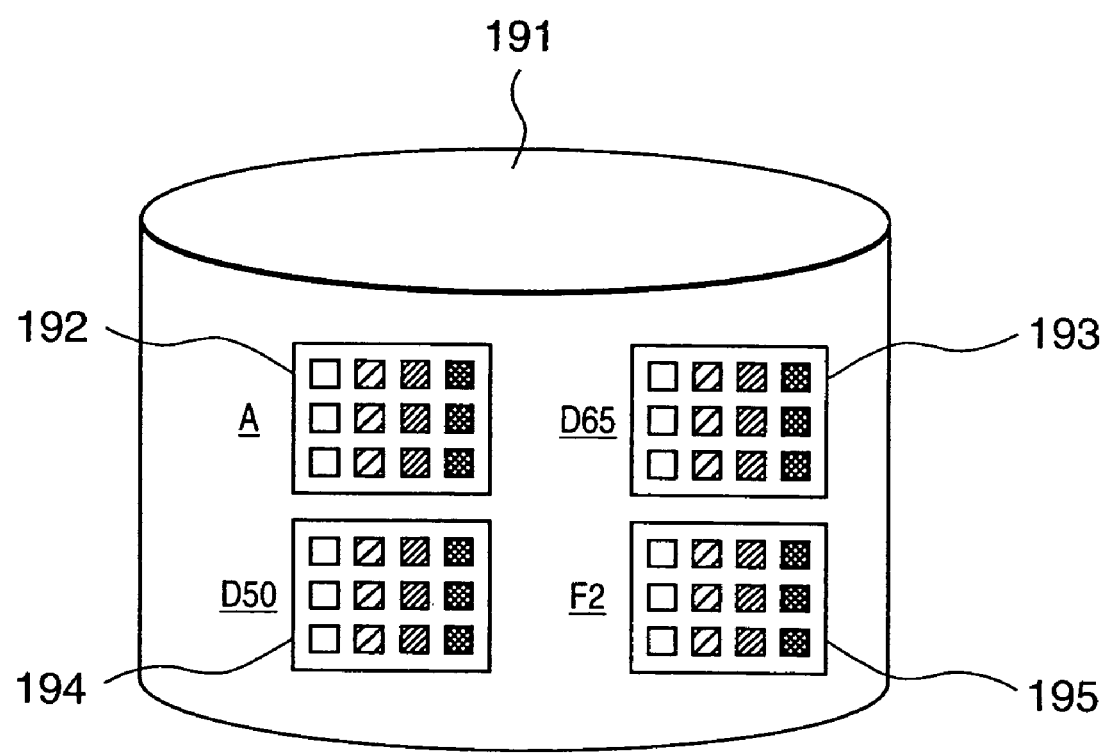
FIG. 20 is a conceptual view of a profile storing XYZ values of a white point under different illuminants, device-dependent RGB values of a color target, XYZ values corresponding to the color target under respective illuminants.

FIG. 20 is a conceptual view of a profile 191 storing XYZ values of a white point under different illuminants, device-dependent RGB values of a color target, and XYZ values corresponding to the color target under respective illuminants.

The color target serves as, for instance, a color target of IT8 defined by ANSI in a case of an input device, and serves as, for instance, 9×9×9 RGB color patches in a case of an output device. For instance, reference numeral 192 denotes RGB values of a color target and XYZ values under illuminant A (109.85, 100.0, 35.58); 193, RGB values of a color target and XYZ values under illuminant D65 (95.05, 100.0, 108.88); 194, RGB values of a color target and XYZ values under illuminant D50 (96.42, 100.0, 82.49); and 195, RGB values of a color target and XYZ values under illuminant F2 (99.20, 100.0, 67.40). XYZ values of a color target under different illuminants as mentioned above can be obtained from a spectral distribution of each illuminant and a spectral reflectance of each color target. Therefore, instead of each of the XYZ values, the spectral distribution of each illuminant and spectral reflectance of each color target may be stored in the profile 191. Herein, if the color target used in each profile is fixed, RGB values of each color target and data for spectral reflectance are common for each illuminant. Therefore, data related to the color target can be shared in each of the illuminants.

Figure 21:
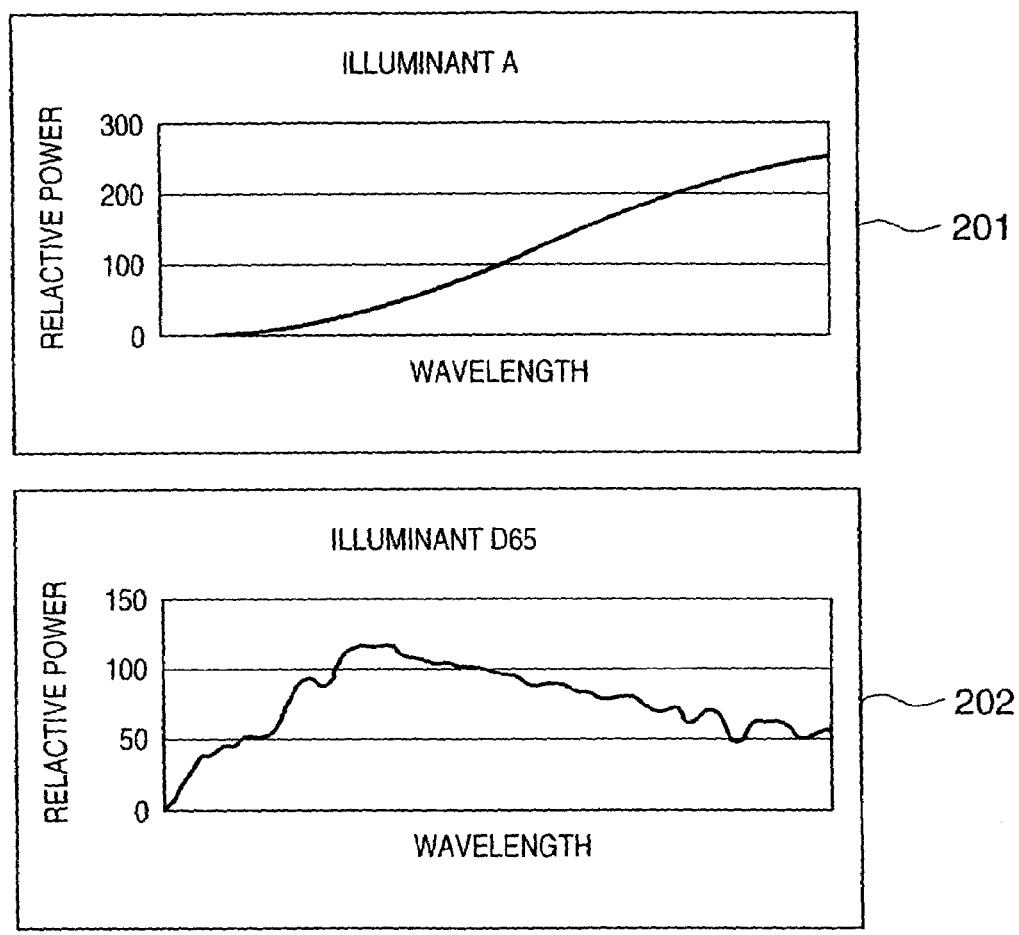
FIG. 21 shows a spectral distribution of a standard illuminant.

FIG. 21 shows a spectral distribution of a standard illuminant, wherein reference numeral 201 denotes a spectral distribution for the illuminant A, and reference numeral 202 denotes a spectral distribution for illuminant D65. By measuring a spectral distribution of an illuminant in an actual viewing condition, it is possible to generate a profile dependent on a viewing condition with better precision.

As shown in FIG. 20, in a case where XYZ values under a plurality of standard illuminants, such as the illuminants A, D65, D50, and F2, are stored in the profile, XYZ values under a standard illuminant which is closest to the actual viewing condition are converted to XYZ values for the viewing condition. To select the XYZ values under an illuminant closest to the viewing condition, a search is performed utilizing the XYZ values of a white point under illuminants, which have been stored in the profile. For instance, assuming that the white point under each illuminant is XwYwZw, the chromaticity (xw, yw) can be obtained by equation (7).

$$xw = \frac{Xw}{Xw+Yw+Zw}$$
$$yw = \frac{Yw}{Xw+Yw+Zw}$$
(7)

Similarly, the chromaticity (x, y) of the white point under the viewing condition is obtained by equation (8). A distance dw from a white point under each illuminant to a white point under a viewing condition is evaluated by, for instance, equation (9).

$$x = \frac{X}{X+Y+Z}$$
$$y = \frac{Y}{X+Y+Z}$$
(8)

$$dw = \sqrt{(x-xw)^2 + (y-yw)^2}$$
(9)

From the above calculation result, colorimetric data which is closest to the actual viewing condition is selected, thereby obtaining XYZ values which base upon the viewing condition, with better precision. Herein, the method similar to the above-described embodiments is used to convert XYZ values stored in the profile to XYZ values which base upon a viewing condition. The XYZ values of the colorimetric illuminant reference are converted to the color perception space JCH by the color appearance model based on a colorimetric condition, and then converted back to XYZ values based on a viewing condition different from the colorimetric condition. In a case where the distance dw from a white point under each illuminant to a white point under the viewing condition is zero, the colorimetric data may be used as the XYZ values for the viewing condition. Besides this, the distance may be evaluated by a difference between a color temperature Tw of a white point under each illuminant and a color temperature T of a white point under a viewing condition.

Figure 22:
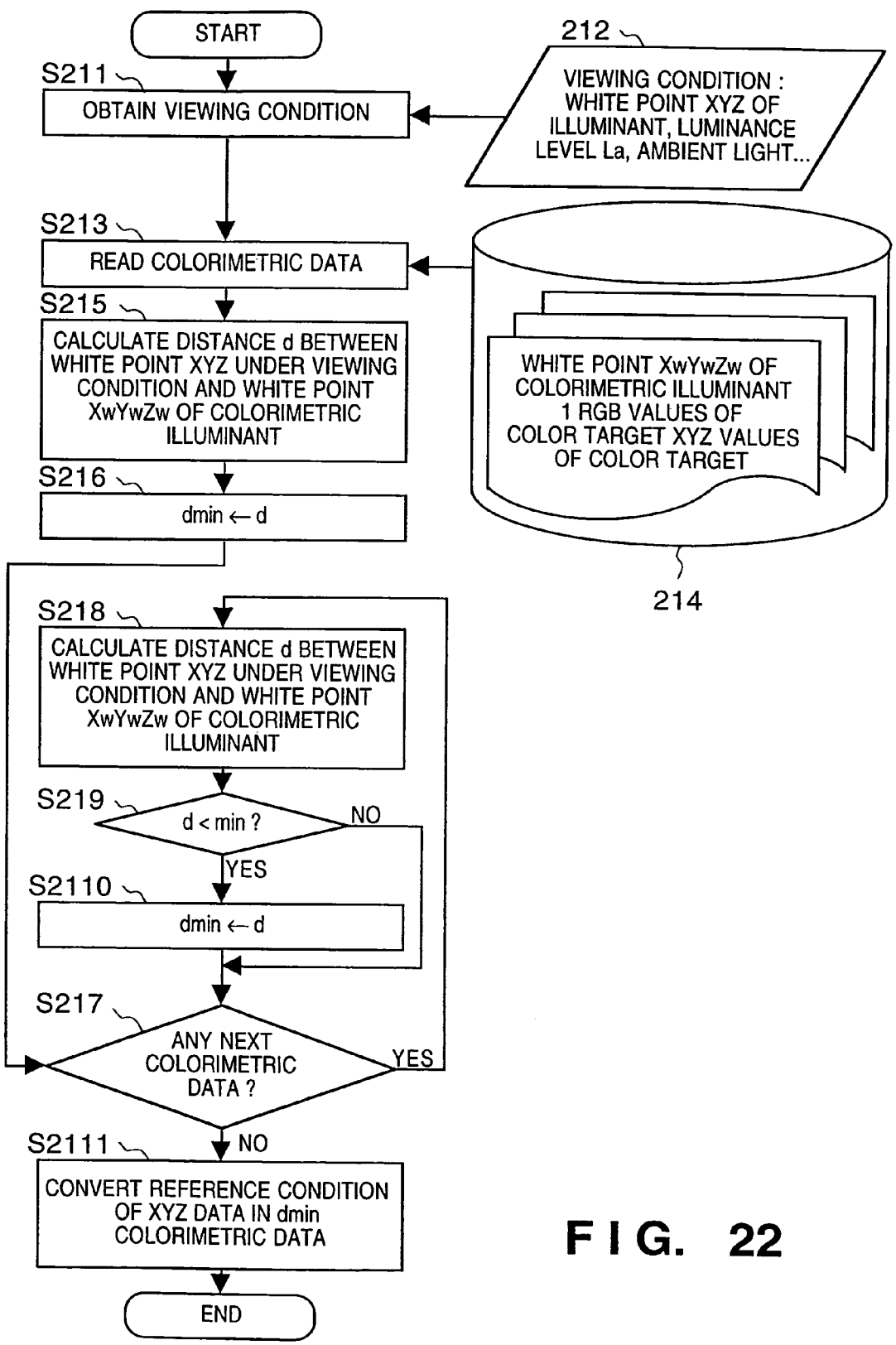
FIG. 22 is a flowchart showing the process of conjecturing a colorimetric value from the colorimetric data for plural illuminants.

FIG. 22 is a flowchart showing the process of conjecturing a colorimetric value from the colorimetric data for plural illuminants. Herein, step S211 in FIG. 22 corresponds to step S44 in FIG. 4, step S54 in FIG. 5, step S64 in FIG. 6, step S74 in FIG. 7, step S144 in FIG. 14, step S154 in FIG. 15, and step S174 in FIG. 17.

[Caching Profile Data Dependent on Viewing Condition]

As mentioned above, because the processing for generating a profile dependent on a viewing condition is relatively complicated, it is time consuming to perform calculation each time color matching or the like is executed. In the normal usage state, once the viewing conditions of the data source side and the data destination side are set, it is often the case that users do not change the setting. Therefore, by caching a LUT or the like for mutually converting a device-independent color space to a device-dependent color space under a viewing condition, it is possible to improve the processing efficiency.

Since the viewing condition can be set independently for the data source side and data destination side, the LUT for mutually converting a device-independent color space to a device-dependent color space under a viewing condition is cached for each profile. The LUT is cached in each profile or other cache files. A LUT corresponding to the current viewing condition may be cached, or a LUT corresponding to plural viewing conditions may be cached in unit of each viewing condition.

For instance, in a case of using ICC profile, a LUT for a viewing condition, which corresponds to AtoBx Tag, BtoAx Tag, Gamut Tag or the like in each profile, is stored as a private tag.

Figure 23:
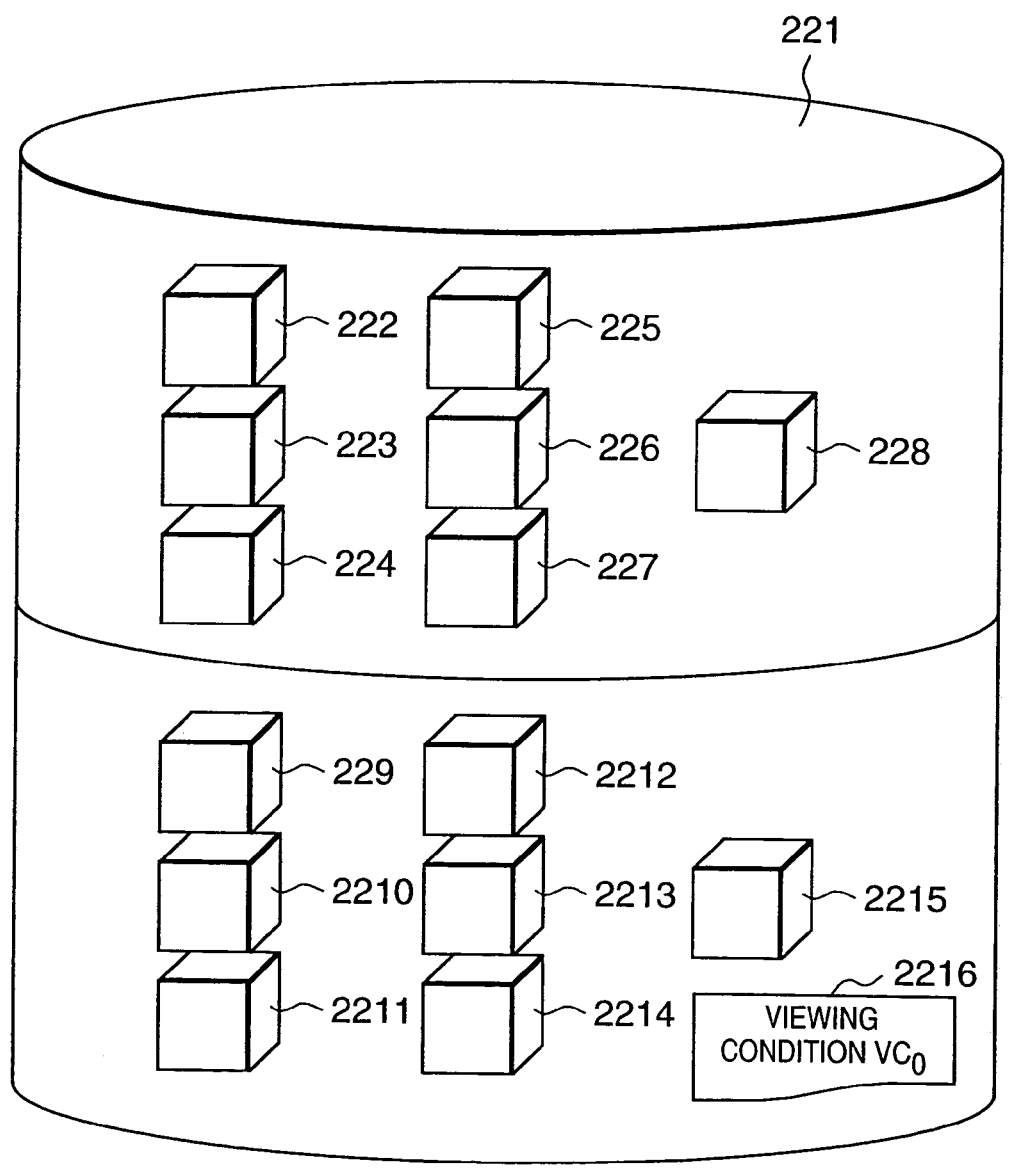
FIG. 23 shows an example in which a LUT, provided for mutually converting a device-independent color space under a viewing condition to a device-dependent color space, is stored in the ICC profile.

FIG. 23 shows an example in which a LUT, provided for mutually converting a device-independent color space which bases upon a viewing condition to a device-dependent color space, is stored in the ICC profile. In the profile 221 including the cached LUT, AtoB0 Tag 222, AtoB1 Tag 223, AtoB2 Tag 224, BtoA0 Tag 225, BtoA1 Tag 226, BtoA2 Tag 227, and gamut Tag 228 are stored as a public tag. Herein, the LUT stored as a public tag is provided for mutually converting a device-independent color space employing D50 reference to a device-dependent color space. Furthermore, the profile 228 includes, as a private tag, LUTs 229 to 2215 which correspond to public tags 222 to 227, for mutually converting a device-independent color space which bases upon a viewing condition to a device-dependent color space. In the private tag, a viewing condition 2216 at the time of caching is stored independently of the cached LUT.

Figure 24:
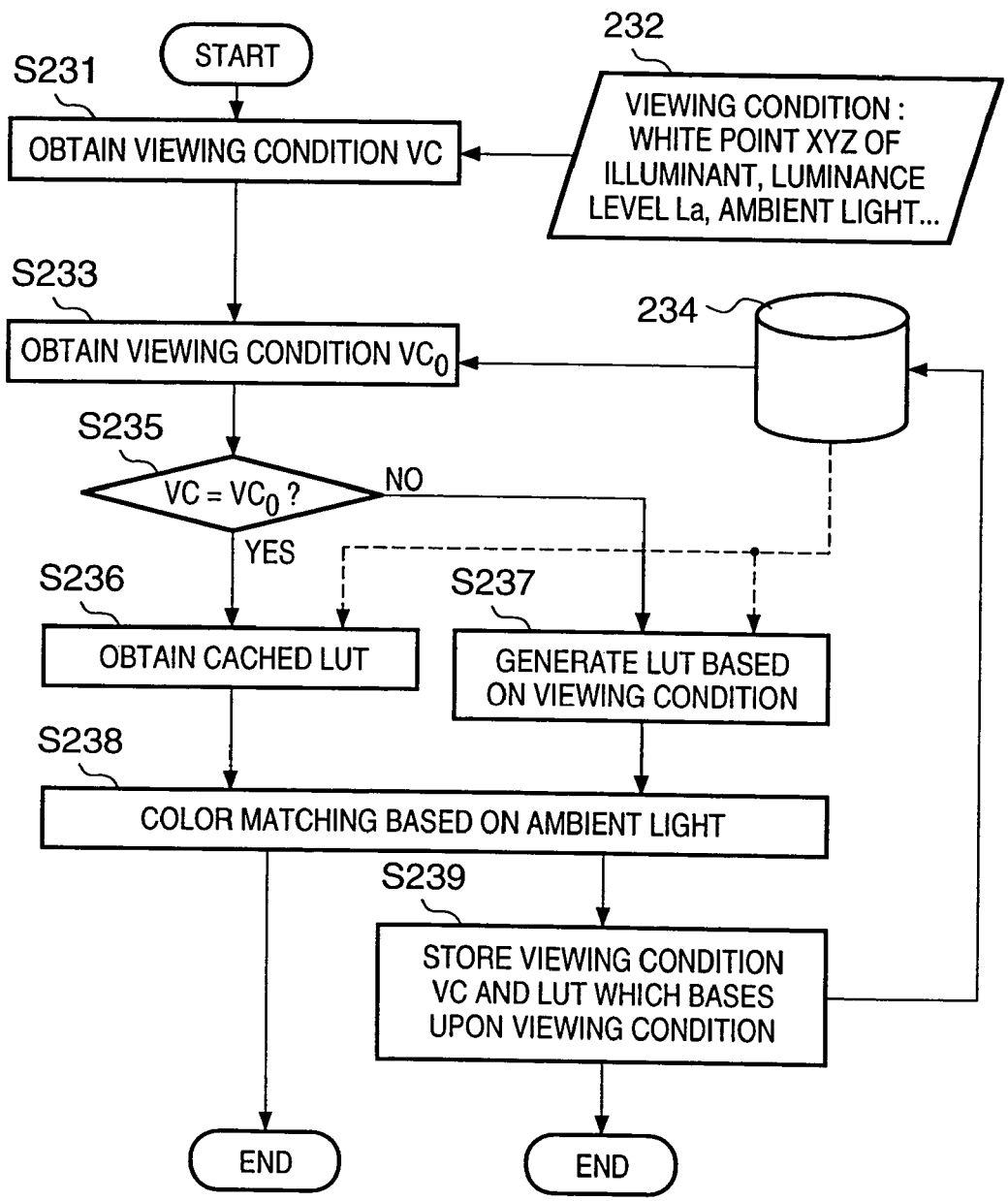
FIG. 24 is a flowchart showing caching processing.

FIG. 24 is a flowchart showing caching processing. The processing described hereinafter is an independent process for the data source side and for the data destination side.

First, a viewing condition VC is obtained by user setting or the like. Next, cached LUT's viewing condition VC0 is obtained from a profile 232. The viewing condition VC is compared with the viewing condition VC0 in terms of, for instance, a white point of an illuminant. If a match is found between the viewing conditions, it is determined that the viewing condition is the same as the condition where the last time an LUT is cached. Thus, the cached LUT is used for color matching or the like. On the other hand, if a match is not found between the viewing conditions, a LUT necessary for color matching is generated based on the viewing condition.

The method of generating a LUT which is dependent on a viewing condition is the same as the method described with reference to FIGS. 4, 6, 7, 12 and 13. For the data source side, the conversion LUT 11 shown in FIG. 12 is cached, while for the data destination side, a LUT combining the LUT 132 and conversion LUT 16 shown in FIG. 12 is cached (i.e., equivalent to the conversion LUT 21 or 26 shown in FIG. 13). The viewing condition at the time of LUT generation and the LUT which is dependent on the viewing condition are used for color matching or the like, and then stored as a private tag in the profile.

According to each of the above-described embodiments, the following effects are achieved.

(1) Different viewing conditions (white point of an ambient light, illumination level and so on) can be set for each of the image data source side and the image data destination side. By this, for instance, color reproduction under an environment of a remote place connected by a network can be simulated.

(2) XYZ values employing an ambient light in the image data source side as a reference are converted by a human color appearance model to the JCH color space or QMH color space based on a viewing condition of the image data source side (white point of an ambient light, illumination level and so on), and then converted back to XYZ values employing an ambient light in the image data destination side as a reference, based on a viewing condition of the image data destination side (white point of an ambient light, illumination level and so on). By this, color matching can be performed with independent setting of viewing conditions of the image data source side and image data destination side.

(3) Gamut-mapping is performed in the QMH (or JCH) color space, which is the human color perception space. By virtue of this, human color perception characteristics, such as the contour lines of hue, can be reflected upon the gamut mapping, and color matching most appropriate for the ambient light can be performed.

(4) Color matching can be selected from two modes: absolute color matching where the gamut mapping is performed in QMH color space, and relative color matching where the gamut mapping is performed in JCH color space. By virtue of this, it is possible to attempt color matching which is as absolute as possible in the color reproduction range of the output device, or attempt relative color matching which takes the best advantage of the dynamic range of the color reproduction range of the output device, thereby performing color matching most appropriate for the color reproduction range of the output device.

(5) Colorimetric values (XYZ or Lab values) of a color target or color patch are converted to values in the JCH color space by a human color appearance model based on a colorimetric condition (white point of a colorimetric illuminant or illumination level and so on), and then converted back to XYZ (or Lab) values based on a viewing condition (white point of an ambient light and illumination level and so on). By this, XYZ values employing the colorimetric illuminant as a reference are converted to XYZ values employing an ambient light as a reference.

(6) Data indicative of a relation between device-independent data, obtained by colorimetry of a color target under a standard illuminant, and device-dependent data, which is dependent on a device into which the color target data is inputted, is stored in an input profile. In accordance with a viewing condition (white point of an ambient light, illumination level and so on) at the time of viewing an image to be inputted, a conversion matrix or a conversion LUT for converting device-dependent data to device-independent data is dynamically generated. By this, color matching corresponding to the ambient light at the time of viewing the image to be inputted can be performed. Furthermore, the conversion matrix or conversion LUT for converting device-dependent data stored in the input profile to device-independent data (standard illuminant reference) is dynamically updated in accordance with a viewing condition at the time of viewing the image to be inputted (white point of an ambient light, illumination level and so on). By this, color matching corresponding to the ambient light at the time of viewing the image to be inputted can be performed.

(7) A conversion matrix or a conversion LUT for converting device-dependent data stored in a monitor profile to device-independent data (white point reference of a monitor or standard illuminant reference) is dynamically updated in accordance with a viewing condition of a monitor (white point of an ambient light, luminance level and so on). By this, color matching corresponding to an ambient light of a monitor can be performed.

(8) Data indicative of a relation between device-dependent data of a color patch and device-independent data obtained by colorimetry of a printout of the color patch under a standard illuminant, is stored in an output profile. In accordance with a viewing condition (white point of an ambient light, illumination level and so on) at the time of viewing the printout, a conversion LUT for converting device-independent data to device-dependent data is dynamically generated. By this, color matching corresponding to an ambient light at the time of viewing an output original can be performed.

<Sixth Embodiment>

Described in a sixth embodiment is an example of a Graphic User Interface (GUI) for manually setting a viewing condition (e.g., viewing condition 1 or 2 in FIG. 2) for each of the foregoing embodiments.

FIG. 25 shows a GUI 191 for setting a parameter of a viewing condition according to the sixth embodiment.

Reference numeral 192 denotes a text box for inputting a luminance of a viewing subject at the time of viewing an input; 193, a drop-down combo-box for selecting the type of white point in the viewing subject at the time of viewing an input; 194, a drop-down combo-box for selecting a viewing condition at the time of viewing an input; 195, a text box for inputting a chromatic adaptability at the time of viewing an input; 196, a text box for inputting a luminance of a viewing subject at the time of viewing an output; 197, a drop-down combo-box for selecting a white point in the viewing subject at the time of viewing an output; 198, a drop-down combo-box for selecting a viewing condition at the time of viewing an output; and 199, a text box for inputting a chromatic adaptability at the time of viewing an output.

Note that the luminance relates to the luminance LA in the CIE CAM97s shown in FIG. 19; an illuminant relates to XwYwZw; an ambient light relates to the constant c, factor Nc, lightness contrast factor FLL and factor for degree of adaptation F; and an adaptability relates to the variable D. Although the variable D is obtained by LA and F according to the CIE CAM97s in FIG. 19, the variable D according to the sixth embodiment is controlled manually.

Normally, about 20% of a white point is inputted as a luminance of a viewing subject. To obtain the type of white point in the viewing subject, XYZ values of a white point in the viewing subject are necessary. However, for a simple explanation, it is assumed herein that the reflectivity of a white point in the medium used is 100%, and therefore, a white point of an illuminant is used herein. Furthermore, although it is better to utilize a white point of the illuminant under the actual viewing condition, it is assumed herein that a standard illuminant type is selected. As the type of standard illuminant, there are illuminants A, C, D65, D50, D93, F2, F8, and F11. Since an image is the viewing subject herein, a relative luminance of the background is assumed to be 20%. With respect to the viewing condition, if a relative luminance of the ambient is equal to or larger than 20%, which has been assumed as the background relative luminance, the subject is determined as "average surround". If the ambient relative luminance is less than 20%, the subject is determined as "dim". If the ambient relative luminance is almost 0%, the subject is determined as "dark". With respect to the chromatic adaptability, the value is adjusted such that 1.0 attains complete adaptation and 0.0 attains no adaptation.

<Seventh Embodiment>

For setting a parameter of a viewing condition as described in the sixth embodiment, values must be directly inputted. Therefore, handling the GUI is extremely difficult for general users who are not an color expert. In the seventh embodiment, the GUI 191 described in the sixth embodiment is improved for the ease of use.

The characteristic configuration of the seventh embodiment is as follows.

(1) Parameter setting display is changed according to a user's level.

(2) A user can adjust the chromatic adaptability by designating a space between a viewing subject of a data source side and a viewing subject of a data destination side.

(3) A user can adjust the balance of the chromatic adaptability between the viewing subject of a data source side and a viewing subject of a data destination side.

(4) A user can adjust an absolute chromatic adaptability while maintaining the balance of the chromatic adaptability between the viewing subject of a data source side and a viewing subject of a data destination side.

FIG. 26 shows a GUI 201 which enables setting of a user level. FIG. 26 shows the state in which "general user" is set as a user level. In the GUI 201, a user does not need to directly input a parameter, but is able to set all the viewing conditions by making selection or adjusting a slide bar. The contents of selections are expressed in a user-friendly manner.

Referring to FIG. 26, reference numeral 202 denotes a drop-down combo-box for selecting a user level; 203, a drop-down combo-box for selecting a viewing subject at the time of viewing an input; 204, a drop-down combo-box for selecting a luminance level in the viewing subject at the time of viewing the input; 205, a drop-down combo-box for selecting the type of white point in the viewing subject at the time of viewing the input; 206, a drop-down combo-box for selecting a viewing condition at the time of viewing the input; 207, a drop-down combo-box for selecting a viewing subject at the time of viewing an output; 208, a drop-down combo-box for selecting a luminance level in the viewing subject at the time of viewing the output; 209, a drop-down combo-box for selecting the type of white point in the viewing subject at the time of viewing the output; 2010, a drop-down combo-box for selecting a viewing condition at the time of viewing the output; 2011, an icon indicative of the viewing subject at the time of viewing an input with the set viewing spacing; and 2012, an icon indicative of the viewing subject at the time of viewing an output with the set viewing spacing.

Figure 27:
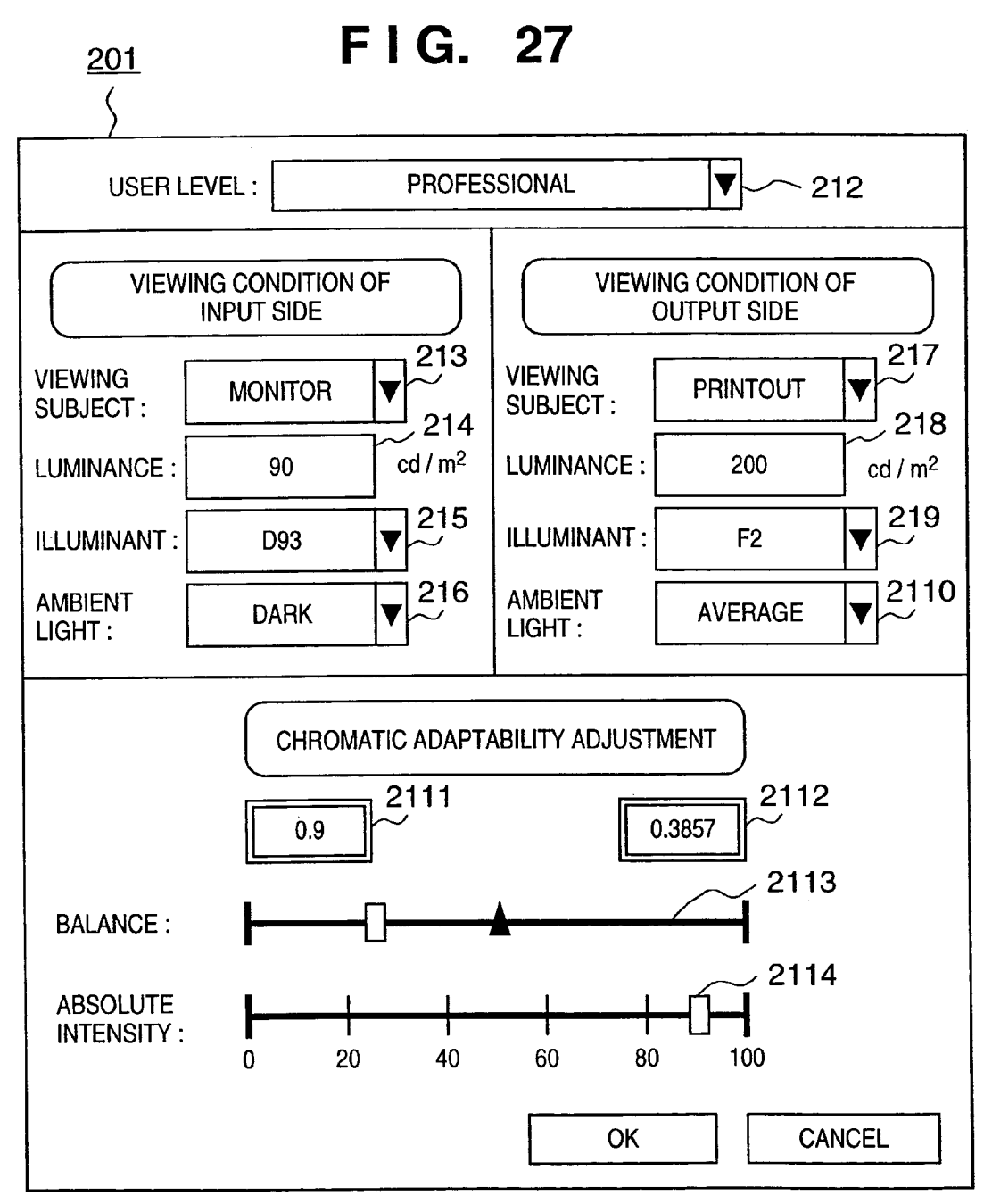

The displayed user level is switched, for instance, as shown in FIG. 27, by designating the drop-down combo-box 202 for selecting a user level. Items of selectable viewing subject include "monitor", "original document", "printout" and so forth, and depending on the selected item, items of selection menu and values set according to the item vary. Items of selectable luminance level for the viewing subject include "bright", "relatively light", "average", "relatively dark", which are expressed in the intuitive manner for general users. Also, items of selectable white point in the viewing subject do not include expressions for expert users such as D93 or F2 or the like, but include expressions for general users, such as "bluish white", "white", and "yellowish white" for a monitor, and "white fluorescent light", "neutral white fluorescent light", "incandescent light", "clear weather in the open air", "overcast weather in the open air" for an original document or printout.

For setting a viewing space, the space between the viewing subjects is adjusted by operating the slide bar, for instance, for comparing a monitor and a printout placed next to each other, or comparing the subjects placed apart from each other. The setting concerns with determination of a chromatic adaptability. The viewing subjects are expressed by icons so that a user can intuitively adjust the distance between the icons by using a slide bar.

The chromatic adaptability is defined by the following equation according to CIE CAM97s.

$$\text{complete adaptation}: D = 1.0$$

$$\text{no adaptation}: D = 0.0$$

$$\text{incomplete adaptation}: D = F - \frac{F}{1 + 2 \cdot LA^{\frac{1}{4}} + \frac{LA^2}{300}}$$

Herein, D indicates the chromatic adaptability. F indicates a constant which varies in accordance with a viewing condition, wherein F is 1.0 in the average surround and 0.9 in the dim or dark condition. La indicates a luminance in the viewing subject. The chromatic adaptability D can be set independently for the input side and output side.

In the present embodiment, the chromatic adaptability at the time of viewing an input and output is defined such that the chromatic adaptability is changed in accordance with the space (viewing distance) between the viewing subject in the input side and the viewing subject in the output side. Assuming that the complete adaptation is most closely achieved when the viewing distance is infinite, the chromatic adaptability can be defined by the following equation.

$$Ds0 = Fs - \frac{F}{1 + 2 \cdot LA^{\frac{1}{4}} + \frac{LAs^2}{300}}$$

$$Dd0 = Fd - \frac{Fd}{1 + 2 \cdot LA^{\frac{1}{4}} + \frac{LAd^2}{300}}$$

$$Ds = Ds0 \cdot VD + Ds0 \cdot VD0 \cdot (1.0 - VD)$$

$$Dd = Dd0 \cdot VD + Dd0 \cdot VD0 \cdot (1.0 - VD)$$

Herein, Ds0 indicates a chromatic adaptability at the time of viewing an input, which is determined by the luminance level and viewing condition. Fs indicates a constant which varies in accordance with the viewing condition at the time of viewing the input. LAs indicates a luminance in a viewing subject at the time of viewing the input. Dd0 indicates a chromatic adaptability at the time of viewing an output, which is determined by the luminance level and viewing condition. Fd indicates a constant which varies in accordance with the viewing condition at the time of viewing the output. LAd indicates a luminance in a viewing subject at the time of viewing the output. Ds indicates a chromatic adaptability at the time of viewing an input, which is determined by the viewing distance, luminance level, and viewing condition. Dd indicates a chromatic adaptability at the time of viewing an output, which is determined by the viewing distance, luminance level, and viewing condition. VD indicates the position of a slide bar indicative of a viewing distance, wherein if the viewing distance is zero, VD takes the minimum value 0.0, while if the viewing distance is infinity, VD takes the maximum value 1.0. VD0 indicates a constant for determining a chromatic adaptability when the viewing distance is zero.

FIG. 27 shows a GUI 211 in a case where the user level is set in the "professional" level. Since the GUI is for expert users, parameters can be inputted directly, and items are expressed by technical expressions.

Herein, reference numeral 2111 denotes a static text for displaying a value of a chromatic adaptability as a viewing condition at the time of viewing an input; 2112, a static text for displaying a value of a chromatic adaptability as a viewing condition at the time of viewing an output; 2113, a slide bar for adjusting the balance of a chromatic adaptability between a viewing subject in the input side and a viewing subject in the output side; and 2114, a slide bar for adjusting an absolute chromatic adaptability while maintaining the balance of the chromatic adaptability between the viewing subject in the input side and the viewing subject in the output side.

The chromatic adaptability in the input side and output side is defined as follows so as to be adjustable by the balance and absolute intensity.

$$Ds0 = 1.0 - BL$$

$$Dd0 = BL$$

$$Ds = \frac{Ds0}{\text{MAX}(Ds0, Dd0)} \times VL$$

$$Dd = \frac{Dd0}{\text{MAX}(Ds0, Dd0)} \times VL$$

Herein, Ds0 indicates a chromatic adaptability at the time of viewing an input, which is determined by the balance adjustment of the chromatic adaptability. Dd0 indicates a chromatic adaptability at the time of viewing an output, which is determined by the balance adjustment of the chromatic adaptability. BL indicates the position of a slide bar indicative of a balance, wherein if the balance at the time of viewing an input is 100%, BL takes the minimum value 0.0, and if the balance at the time of viewing an output is 100%, BL takes the maximum value 1.0, and the center is 0.5. Ds indicates a chromatic adaptability at the time of viewing an input, which is determined by the balance of the chromatic adaptability and absolute intensity adjustment. Dd indicates a chromatic adaptability at the time of viewing an output, which is determined by the balance of the chromatic adaptability and absolute intensity adjustment. VL indicates the position of a slide bar indicative of an absolute intensity, wherein if the intensity is zero, VL takes the minimum value 0.0, and if the intensity is maximum, VL takes the maximum value 1.0. Note that MAX( ) indicates the selection of the maximum value in the parenthesis.

The balance is adjusted such that the complete adaptation is attained when the balance intensity is large. Then, the balance intensity adjusts the entire chromatic adaptability while maintaining the balance. In other words, if the balance is set in the center and the absolute intensity is set to the maximum value, the chromatic adaptability in the input side and output side both attains complete adaptation.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

The present invention is not limited to the above embodiments and various changes and modifications can be made within the spirit and scope of the present invention. Therefore, to appraise the public of the scope of the present invention, the following claims are made.

What is claimed is:

1. An image processing method for performing a color process based on a color appearance model, said method comprising the steps of:
   using a user interface, inputting space information, which represents a space between locations of a viewing subject at a data source side and a viewing subject at a data destination side, based on an instruction of a user entered through the user interface, in which the space information is adjusted by comparing a monitor and a printer placed next to each other or apart from each other so that the user is able to make a determination of chromatic adaptability;
   setting a parameter of a viewing condition based on the inputted space information; and
   performing the color process based on the color appearance model by using the set parameter.

2. The method according to claim 1, wherein the parameter includes a chromatic adaptability condition.

3. The method according to claim 1, further comprising the step of inputting plural items of viewing information which relate to a viewing condition of the data source side and a viewing condition of the data destination side.

4. The method according to claim 1, wherein the color process comprises color matching processing based on profiles of the data source side and the data destination side.

5. The method according to claim 1, in which the space information is adjusted by operating a slide bar.

6. An image processing method comprising the steps of:
   using a user interface for manually inputting space information which represents a space between locations of a viewing subject at a data source side and a viewing subject at a data destination side, in which the space information is adjusted by comparing a monitor and a printer placed next to each other or apart from each other so that the user is able to make a determination of chromatic adaptability;
   using a user interface for manually inputting viewing information which relates to a viewing condition, for performing color process on input image data based on a color appearance model;
   setting a parameter of viewing condition based on the inputted space information and viewing information; and
   performing the color process based on the color appearance model by using the set parameter.

7. The method according to claim 6, in which the space information is adjusted by operating a slide bar.

8. An image processing apparatus for performing a color process based on a color appearance model, said apparatus comprising:
   an inputting section, arranged to input space information which represents a space between locations of a viewing subject at a data source side and a viewing subject at a data destination side, based on an instruction of a user using a user interface, wherein the space information is adjusted by comparing a monitor and a printer placed next to each other or apart from each other so that the user is able to make a determination of chromatic adaptability;
   a setter, arranged to set a parameter of viewing condition based on the inputted space information; and
   a processor, arranged to perform the color process based on the color appearance model by using the set parameter.

9. The apparatus according to claim 8, wherein the parameter includes a chromatic adaptability condition.

10. The apparatus according to claim 8, wherein said inputting section farther inputs plural items of viewing information which relate to a viewing condition of the data source side and a viewing condition of the data destination side.

11. The apparatus according to claim 8, wherein the color process comprises color matching processing based on profiles of the data source side and the data destination side.

12. The apparatus according to claim 8, wherein the space information is adjusted by operating a slide bar.

13. A computer program product comprising a computer readable medium storing computer program codes, for an image processing method performing a color process based on a color appearance model, said product comprising process procedure codes for:
   using a user interface, inputting space information which represents a space between locations of a viewing subject at a data source side and a viewing subject at a data destination side, in which the space information is adjusted by comparing a monitor and a printer placed next to each other or apart from each other so that the user is able to make a determination of chromatic adaptability;
   setting a parameter of viewing condition based on the inputted space information; and
   performing the color process based on the color appearance model by using the set parameter.

14. A computer program product comprising a computer readable medium storing computer program codes, for an image processing method performing a color process on input image data based on a color appearance model, said product comprising process procedure codes for:
   realizing a user interface to manually input space information which represents a space between locations of a viewing subject at a data source side and a viewing subject at a data destination side, in which the space information is adjusted by comparing a monitor and a printer placed next to each other or apart from each other so that the user is able to make a determination of chromatic adaptability;
   realizing a user interface to manually input viewing information which relates to a viewing condition;
   setting a parameter of viewing condition based on the inputted space information and viewing information; and
   performing the color process based on the color appearance model by using the set parameter.

* * * * *

UNITED STATES PATENT AND TRADEMARK OFFICE
CERTIFICATE OF CORRECTION

| | |
|---|---|
| PATENT NO. | : 7,158,146 B2 |
| APPLICATION NO. | : 10/929479 |
| DATED | : January 2, 2007 |
| INVENTOR(S) | : Manabu Ohga |

It is certified that error appears in the above-identified patent and that said Letters Patent is hereby corrected as shown below:

ON TITLE PAGE ITEM [56] REFERENCES CITED

Other Publications, (page 2) (insert) --"The CIE 1997 Interim Colour Appearance Model (Simple Version), CIECAM97S," CIE STANDARDS CIE TCI-34 April 1998, XP002154987, Online, Retrieved from the Internet on 12/08/00 <URL: http://www.colour.org/tc8-ov>--.

SHEET 21

Figure 21, "RELACTIVE" (both occurrences) should read --REFRACTIVE--.

COLUMN 2

Line 51, "Yw1 Zw1)" should read --Yw1, Zw1)--.

COLUMN 5

Line 35, "an" should read --a--; and
Line 67, "a" should read --an--.

COLUMN 17

Line 62, "o" should read --of--.

COLUMN 20

Line 41, "unit" should read --units--.

COLUMN 21

Line 44, "Gamut-mapping" should read --Gamut mapping--.

COLUMN 23

Line 33, "an" should read --a--.

COLUMN 26

Line 28, "attains" should read --attain--.

UNITED STATES PATENT AND TRADEMARK OFFICE
CERTIFICATE OF CORRECTION

PATENT NO. : 7,158,146 B2
APPLICATION NO. : 10/929479
DATED : January 2, 2007
INVENTOR(S) : Manabu Ohga It is certified that error appears in the above-identified patent and that said Letters Patent is hereby corrected as shown below:

COLUMN 27

Line 1, "appraise" should read --apprise--.

COLUMN 28

Line 12, "farther" should read --further--.

Signed and Sealed this

Fourteenth Day of August, 2007

JON W. DUDAS
*Director of the United States Patent and Trademark Office*